US012671118B2

(12) United States Patent
Ni et al.

(10) Patent No.: US 12,671,118 B2
(45) Date of Patent: Jun. 30, 2026

(54) BATTERY ASSEMBLY AND PROCESSING METHOD AND APPARATUS THEREFOR, BATTERY CELL, BATTERY, AND POWER CONSUMING DEVICE

(71) Applicant: CONTEMPORARY AMPEREX TECHNOLOGY (HONG KONG) LIMITED, Hong Kong (CN)

(72) Inventors: Jun Ni, Ningde City (CN); Fenggang Zhao, Ningde City (CN); Shengwu Zhang, Ningde City (CN); Minghao Tang, Ningde City (CN); Wenfa Lin, Ningde City (CN); Jie Ye, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 495 days.

(21) Appl. No.: 18/328,777

(22) Filed: Jun. 5, 2023

(65) Prior Publication Data

US 2023/0318044 A1 Oct. 5, 2023

Related U.S. Application Data

(63) Continuation of application No. PCT/CN2021/108060, filed on Jul. 23, 2021.

(51) Int. Cl.
| | |
|---|---|
| *H01M 10/0587* | (2010.01) |
| *H01M 10/0525* | (2010.01) |
| *H01M 50/46* | (2021.01) |

(52) U.S. Cl.
CPC ... *H01M 10/0587* (2013.01); *H01M 10/0525* (2013.01); *H01M 50/461* (2021.01); *H01M 2220/20* (2013.01)

(58) Field of Classification Search
CPC ......... H01M 10/0587; H01M 10/0525; H01M 10/0431; H01M 10/052; H01M 10/0409;
(Continued)

(56) References Cited

U.S. PATENT DOCUMENTS

| | | |
|---|---|---|
| 4,802,275 A | 2/1989 | Freluche |
| 12,087,914 B2 * | 9/2024 | Fu ..................... H01M 10/0587 |
| 2020/0168873 A1 | 5/2020 | Zeng et al. |

FOREIGN PATENT DOCUMENTS

| | | |
|---|---|---|
| CN | 103996875 B | 8/2016 |
| CN | 107093694 A | 8/2017 |

(Continued)

OTHER PUBLICATIONS

English Translation of CN-212810367-U from Espacenet (Year: 2021).*

(Continued)

*Primary Examiner* — Niki Bakhtiari
*Assistant Examiner* — Madison Leigh Kyle
(74) *Attorney, Agent, or Firm* — K&L Gates LLP

(57) ABSTRACT

An electrode assembly and a processing method and apparatus therefor, a battery cell, a battery, and a power consuming device are provided. The processing method includes: applying an adhesive on a preset part of a surface of a member to be coated, the adhesive forming a barrier layer, and the member to be coated including at least one of a cathode plate, a separator, and an anode plate; and winding the cathode plate, the anode plate, and the separator to form an electrode assembly. The barrier layer is located between the cathode active material layer and the anode active material layer adjacent to each other after the winding. The barrier layer blocks at least some ions de-intercalated from the cathode active material layer located on one side of the (Continued)

barrier layer from being intercalated into the anode active material layer located on the other side of the barrier layer.

18 Claims, 14 Drawing Sheets

(58) Field of Classification Search
CPC . H01M 50/461; H01M 2220/20; Y02E 60/10; Y02P 70/50; C09J 2203/33
See application file for complete search history.

(56) References Cited

FOREIGN PATENT DOCUMENTS

| | | | | | |
|----|------------|---|--------|----------|------------|
| CN | 206379432  | U | 8/2017 | | |
| CN | 107978782  | A | * | 5/2018 | .......... H01M 10/058 |
| CN | 110739426  | A | * | 1/2020 | .......... B05B 7/2489 |
| CN | 210926201  | U | 7/2020 | | |
| CN | 212810367  | U | 3/2021 | | |
| EP | 0283813    | A1 | 9/1988 | | |
| JP | H06209968  | A | 8/1994 | | |
| JP | H10230201  | A | 9/1998 | | |
| JP | 2003157902 | A | 5/2003 | | |
| JP | 2016186866 | A | 10/2016 | | |
| JP | 2021041372 | A | * | 3/2021 | |
| KR | 20180113335 | A | 10/2018 | | |

OTHER PUBLICATIONS

English Translation of JP-2016186866-A (Year: 2016).*
English Translation of CN-110739426-A (Year: 2020).*
English Translation of CN107978782A (Year: 2018).*
English Translation of JP 2021041372 A (Year: 2021).*
Notice of Reasons for Refusal received in the corresponding Japanese Application 2023-505429, mailed on Feb. 26, 2024.
The extended European Search Report received in the corresponding European Application 21950540.1, mailed Nov. 24, 2023.
International Search Report received in the corresponding International Application PCT/CN2021/108060, mailed Sep. 24, 2021.
Written Opinion received in the corresponding International Application PCT/CN2021/108060, mailed Sep. 24, 2021.

* cited by examiner

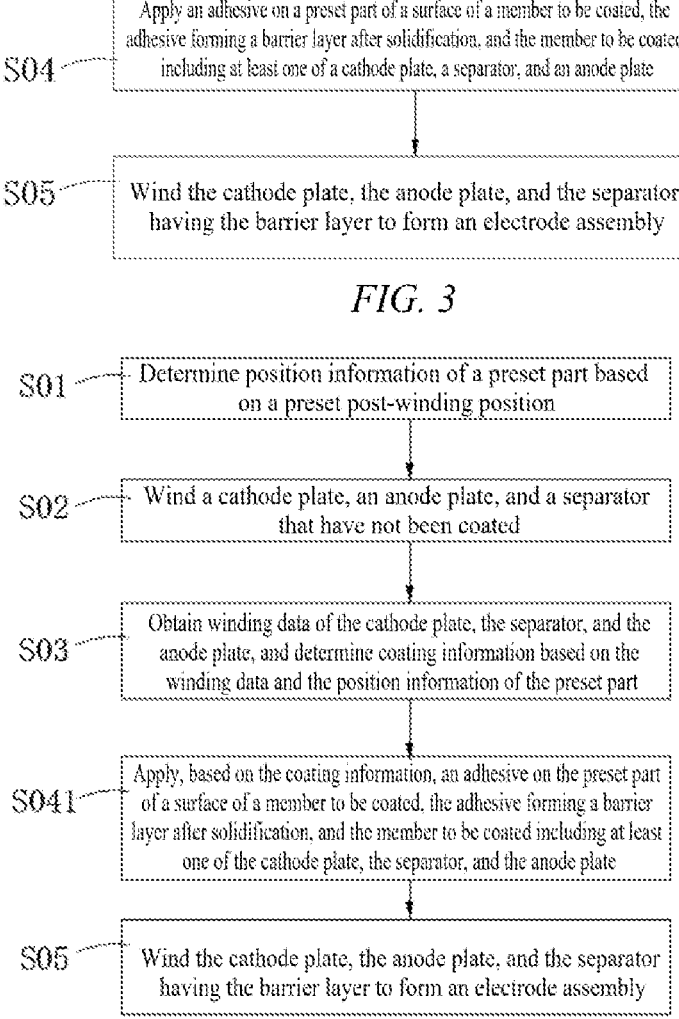

S04 — Apply an adhesive on a preset part of a surface of a member to be coated, the adhesive forming a barrier layer after solidification, and the member to be coated including at least one of a cathode plate, a separator, and an anode plate S05 — Wind the cathode plate, the anode plate, and the separator having the barrier layer to form an electrode assembly

*FIG. 3*

S01 — Determine position information of a preset part based on a preset post-winding position S02 — Wind a cathode plate, an anode plate, and a separator that have not been coated S03 — Obtain winding data of the cathode plate, the separator, and the anode plate, and determine coating information based on the winding data and the position information of the preset part S041 — Apply, based on the coating information, an adhesive on the preset part of a surface of a member to be coated, the adhesive forming a barrier layer after solidification, and the member to be coated including at least one of the cathode plate, the separator, and the anode plate S05 — Wind the cathode plate, the anode plate, and the separator having the barrier layer to form an electrode assembly

*FIG. 4*

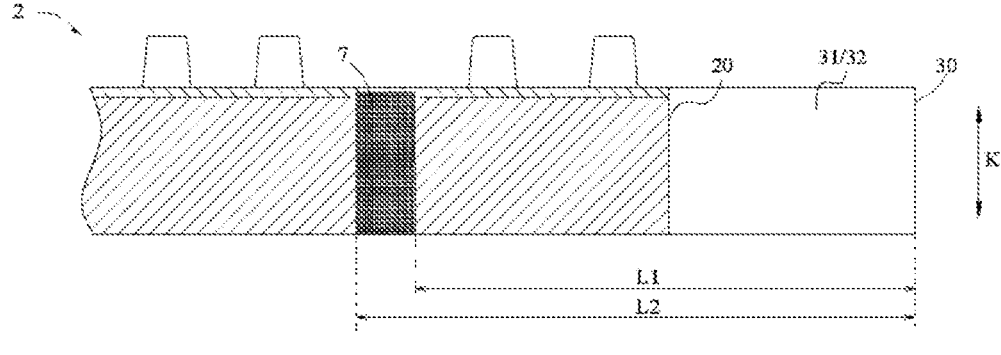

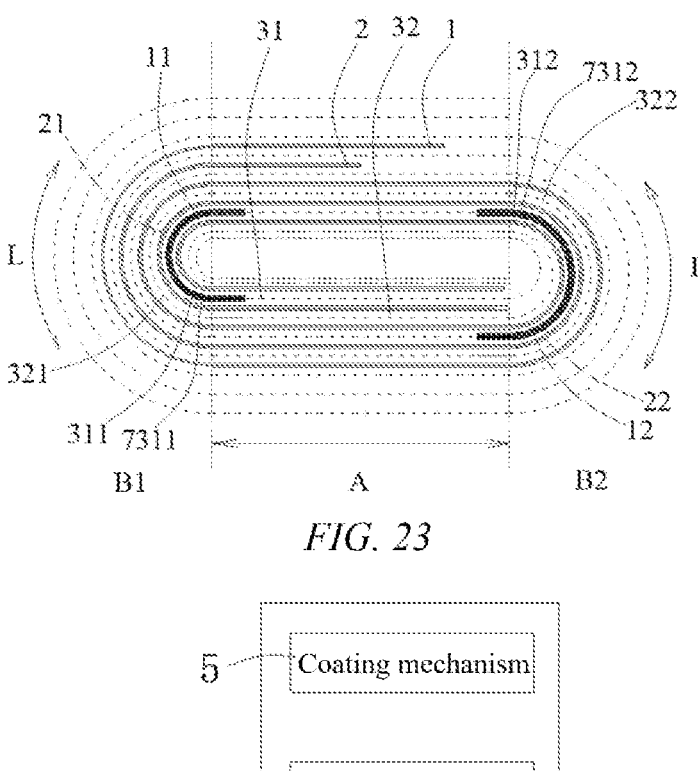
*FIG. 23*
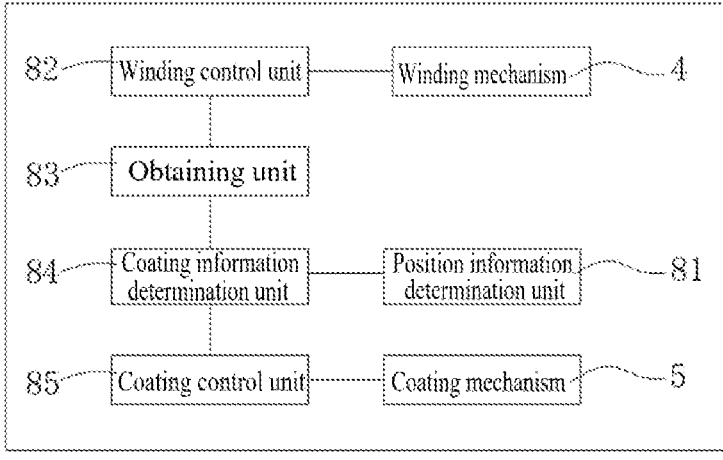
*FIG. 24*
*FIG. 25*

BATTERY ASSEMBLY AND PROCESSING METHOD AND APPARATUS THEREFOR, BATTERY CELL, BATTERY, AND POWER CONSUMING DEVICE

CROSS REFERENCE TO RELATED APPLICATIONS

The present application is a continuation of International Application PCT/CN2021/108060, filed on Jul. 23, 2021 and entitled "BATTERY ASSEMBLY AND PROCESSING METHOD AND APPARATUS THEREFOR, BATTERY CELL, BATTERY, AND POWER CONSUMING DEVICE", the entire disclosure of which is incorporated herein by reference.

TECHNICAL FIELD

The present application relates to the field of batteries, and in particular to an electrode assembly and a processing method and apparatus therefor, a battery cell, a battery, and a power consuming device.

BACKGROUND ART

A rechargeable battery, which may be referred to as a secondary battery, is a battery that can be charged to activate an active material for further use after the battery is discharged. Rechargeable batteries are widely used in electronic devices, such as mobile phones, laptops, electric scooters, electric vehicles, electric aircrafts, electric ships, electric toy cars, electric toy ships, electric toy aircrafts, and power tools.

Rechargeable batteries may include a nickel-cadmium battery, a nickel-hydrogen battery, a lithium-ion battery, a secondary alkaline zinc-manganese battery, etc.

At present, batteries most used in vehicles are usually lithium-ion batteries. As a rechargeable battery, a lithium-ion battery has the advantages of small size, high energy density, high power density, long cycle life, long storage time, etc.

The rechargeable battery includes an electrode assembly and an electrolyte solution. The electrode assembly includes a cathode plate, an anode plate, and a separator located between the cathode plate and the anode plate. The cathode plate may also be referred to as a cathode plate. Both surfaces of the cathode plate have a cathode active material layer thereon. For example, a cathode active material of the cathode active material layer may be lithium manganate, lithium cobaltate, lithium iron phosphate, or lithium nickel-cobalt manganate. The anode plate may also be referred to as an anode plate. Both surfaces of the anode plate have an anode active material layer thereon. For example, an anode active material of the anode active material layer may be graphite or silicon.

Lithium precipitation is a common anomaly in lithium batteries, which affects the charging efficiency and energy density of lithium ions. Severe lithium precipitation may even cause lithium crystallization, which can pierce the separator, causing thermal runaway and internal short circuit, which seriously endangers the safety of the battery.

Therefore, how to reduce or avoid lithium precipitation and improve battery safety has become a challenge in the industry.

SUMMARY OF THE INVENTION

Various aspects of the present application provide an electrode assembly and a processing method and apparatus therefor, a battery cell, a battery, and a power consuming device, which overcome or at least partially solve the problem mentioned above.

A first aspect of the present application provides a processing method for an electrode assembly, the electrode assembly including a cathode plate, an anode plate, and a separator, where the separator is configured to separate the cathode plate from the anode plate; the electrode assembly is formed by winding the cathode plate, the separator, and the anode plate; and the cathode plate includes a cathode active material layer, and the anode plate includes an anode active material layer. The method includes: applying an adhesive on a preset part of a surface of a member to be coated, the adhesive forming a barrier layer, and the member to be coated including at least one of a cathode plate, a separator, and an anode plate; and winding the cathode plate, the anode plate, and the separator to form an electrode assembly, where the barrier layer is located between the cathode active material layer and the anode active material layer adjacent to each other after the winding, and the barrier layer is configured to block at least some ions de-intercalated from the cathode active material layer located on one side of the barrier layer from being intercalated into the anode active material layer located on the other side of the barrier layer.

In this embodiment, the adhesive is applied on the preset part of the surface of the member to be coated, the adhesive forming the barrier layer. The preset part corresponds to a part of the anode active material layer that is prone to lithium precipitation. During charging, at least some ions de-intercalated from the cathode active material layer are blocked by the barrier layer, so that the ions blocked by the barrier layer cannot be intercalated into the anode active material layer adjacent to the cathode active material layer, thereby reducing the occurrence of lithium precipitation at the part of the anode plate that is prone to lithium precipitation, improving the safety performance of a battery cell, and prolonging the service life of the battery cell. Applying the adhesive to form the barrier layer facilitates manufacturing and processing, so that manufacturing efficiency can be improved. The member to be coated may include at least one of the cathode plate, the separator, and the anode plate.

In some embodiments, before the step of applying an adhesive on a preset part of a surface of a member to be coated, the method further includes: determining position information of the preset part based on the preset post-winding position, where the preset post-winding position is a position of the barrier layer in the electrode assembly after the winding, and is located between the cathode active material layer and the anode active material layer adjacent to each other, and the position information of the preset part includes information for characterizing a coating start position and a coating end position of the barrier layer; winding the cathode plate, the anode plate, and the separator that have not been coated; and obtaining winding data of the cathode plate, the separator, and the anode plate, and determining coating information based on the winding data and the position information of the preset part; and then the applying an adhesive on a preset part of a surface of a member to be coated includes: applying, based on the coating information, the adhesive on the preset part of the surface of the member to be coated.

In this embodiment, the position information of the preset part is determined based on the preset post-winding position, the winding data is obtained, the coating information is determined based on the winding data and the position information of the preset part, and then the adhesive is applied, based on the coating information, on the preset part of the surface of the member to be coated, so that automated application of the barrier layer can be implemented. The formation of the barrier layer can be performed synchronously with a winding action, so that application of the barrier layer is accurately implemented.

In some embodiments, the winding data includes a winding linear velocity of the member to be coated, the position information of the preset part includes a coating start point length and a coating end point length of the barrier layer, and the coating information includes a coating start time and a coating end time.

In this embodiment, the coating start time and the coating end time may be determined based on the coating start point length and the coating end point length of the barrier layer and the winding linear velocity of the member to be coated, and an application time of the barrier layer may be determined based on the coating start time and end time, so that automated application of the barrier layer can be accurately implemented.

In some embodiments, the winding data includes an overall winding angle θ of the cathode plate, the separator, and the anode plate, the position information of the preset part includes a coating start angle θ1 and a coating end angle θ2 of the barrier layer, and the coating information includes a coating start signal and a coating end signal.

In this embodiment, the coating start signal and the coating end signal may be determined based on the coating start angle θ1 and the coating end angle θ2 of the barrier layer, and the overall winding angle θ of the cathode plate, the separator, and the anode plate, and the application of the barrier layer is accurately controlled based on the coating start signal and the coating end signal, so that automated application of the barrier layer can be accurately implemented.

In some embodiments, the preset post-winding position is one or both surfaces of the cathode plate, and/or one or both surfaces of the anode plate, and/or one or both surfaces of the separator.

In this embodiment, in all cases where the preset post-winding position is one or both surfaces of the cathode plate, and/or one or both surfaces of the anode plate, and/or one or both surfaces of the separator, some ions can be blocked, and the occurrence of lithium precipitation can be reduced.

In some embodiments, a bent region is formed after the cathode plate, the separator, and the anode plate are wound, and at least part of the preset post-winding position is provided on a surface of at least one of the cathode plate, the anode plate, and the separator in the bent region.

In this embodiment, during charging, the bent region is prone to lithium precipitation; at least part of the barrier layer is provided on the surface of the at least one of the cathode plate, the anode plate, and the separator in the bent region, and at least some ions de-intercalated from the cathode active material layer in the bent region are blocked by the barrier layer, so that the ions blocked by the barrier layer cannot be intercalated into the anode active material layer, in the bent region, of the anode plate adjacent to the cathode plate, thereby reducing the occurrence of lithium precipitation in the bent region, improving the safety performance of the battery cell, and prolonging the service life of the battery cell.

In some embodiments, at least part of the preset post-winding position is provided at a first-bent part and/or a second-bent part of the cathode plate in the bent region, and/or at least part of the preset post-winding position is provided at a first-bent part and/or a second-bent part of the anode plate, and/or at least part of the preset post-winding position is provided at a bent part of the separator that is adjacent to the first-bent part of the cathode plate and/or a bent part of the separator that is adjacent to the second-bent part of the cathode plate, and/or at least part of the preset post-winding position is provided at a bent part of the separator that is adjacent to the first-bent part of the anode plate and/or a bent part of the separator that is adjacent to the second-bent part of the anode plate.

In this embodiment, during charging, the first-bent part of the cathode and the second-bent part of the cathode are prone to lithium precipitation; at least part of the preset post-winding position is provided at the first-bent part and/or the second-bent part of the cathode plate in the bent region, and/or at least part of the preset post-winding position is provided at the first-bent part and/or the second-bent part of the anode plate, and/or at least part of the preset post-winding position is provided at the bent part of the separator that is adjacent to the first-bent part of the cathode plate and/or the bent part of the separator that is adjacent to the second-bent part of the cathode plate, and/or at least part of the preset post-winding position is provided at the bent part of the separator that is adjacent to the first-bent part of the anode plate and/or the bent part of the separator that is adjacent to the second-bent part of the anode plate; and at least some ions de-intercalated from the cathode active material layer at the first-bent part of the cathode and the second-bent part of the cathode are blocked by the barrier layer, so that the ions blocked by the barrier layer cannot be intercalated into the anode active material layer, in the bent region, of the anode plate that is adjacent to the cathode plate, thereby reducing the occurrence of lithium precipitation on the anode plate adjacent to the first-bent part of the cathode and the second-bent part of the cathode, improving the safety performance of the battery cell, and prolonging the service life of the battery cell.

In some embodiments, a method for applying the adhesive on the preset part of the surface of the separator includes: a press coating method, a roll coating method, or a spraying method.

In this embodiment, the adhesive can be quickly applied by means of press coating, roll coating, or spraying.

In some embodiments, the adhesive includes at least one of polyacrylic acid/acrylate, butyl benzene, phenylanine, ethylene-vinyl acetate copolymer, polypropylene, polyvinylidene fluoride, carboxymethyl cellulose, epoxy adhesive, silicone, polyurethane adhesive, styrene-isoprene-styrene copolymer adhesive, and modified materials thereof.

A second aspect of the present application provides a processing apparatus for an electrode assembly, the electrode assembly including a cathode plate, an anode plate, and a separator, where the separator is configured to separate the cathode plate from the anode plate; the electrode assembly is formed by winding the cathode plate, the separator, and the anode plate; and the cathode plate includes a cathode active material layer, and the anode plate includes an anode active material layer. The processing apparatus includes: a coating mechanism configured to apply an adhesive on a preset part of a surface of a member to be coated, the adhesive forming a barrier layer, and the member to be coated including at least one of a cathode plate, a separator, and an anode plate; and a winding mechanism configured to wind the cathode plate, the anode plate, and the separator to form the electrode assembly, the coating mechanism being located upstream of the winding mechanism, where the barrier layer is located between the cathode active material layer and the anode active material layer adjacent to each other after the winding, and the barrier layer is configured to: after the winding, block at least some ions de-intercalated from the cathode active material layer located on one side of the barrier layer from being intercalated into the anode active material layer located on the other side of the barrier layer.

In this embodiment, the coating mechanism is provided upstream of the winding mechanism, the barrier layer is formed at the preset part of the surface of the member to be coated, and after the cathode plate, the separator, and the anode plate are wound to form the electrode assembly, the preset part corresponds to a part of the anode active material layer that is prone to lithium precipitation. The barrier layer can block at least some ions de-intercalated from the cathode active material layer located on one side of the barrier layer from being intercalated into the anode active material layer located on the other side of the barrier layer. During charging, at least some ions de-intercalated from the cathode active material layer are blocked by the barrier layer, so that the ions blocked by the barrier layer cannot be intercalated into the anode active material layer, thereby reducing the occurrence of lithium precipitation at the part of the anode plate that is prone to lithium precipitation, improving the safety performance of a battery cell, and prolonging the service life of the battery cell.

In some embodiments, the processing apparatus further includes: a position information determination unit, which determines position information of the preset part based on the preset post-winding position and sends the position information to a coating information confirmation unit, where the preset post-winding position is a position of the barrier layer in the electrode assembly after the winding, and is located between the cathode active material layer and the anode active material layer adjacent to each other, and the position information of the preset part includes information for characterizing a coating start position and a coating end position of the barrier layer; a winding control unit configured to control the winding mechanism to wind the cathode plate, the anode plate, and the separator that have not been coated; an obtaining unit configured to obtain winding data of the cathode plate, the separator, and the anode plate, and send the winding data to the coating information determination unit; the coating information determination unit configured to determine coating information based on the winding data and the position information of the preset part; and a coating control unit configured to control, based on the coating information, the coating mechanism to apply the adhesive on the surface of the member to be coated.

In this embodiment, the position information determination unit determines the position information of the preset part based on the preset post-winding position, the winding control unit controls the winding mechanism, the obtaining unit obtains the winding data, the coating information determination unit determines the coating information based on the winding data and the position information of the preset part, and then the coating control unit applies, based on the coating information, the adhesive on the preset part of the surface of the member to be coated, so that automated application of the barrier layer can be implemented. The formation of the barrier layer can be performed synchronously with a winding action, so that application of the barrier layer can be accurately implemented.

In some embodiments, the winding data includes a winding linear velocity of the member to be coated, the position information of the preset part includes a coating start point length and a coating end point length of the barrier layer, and the coating information includes a coating start time and a coating end time.

In this embodiment, the coating start time and the coating end time may be determined based on the coating start point length and the coating end point length of the barrier layer and the winding linear velocity of the member to be coated, and an application time of the barrier layer may be determined based on the coating start time and end time, so that automated application of the barrier layer can be accurately implemented.

In some embodiments, the winding data includes an overall winding angle $\theta$ of the cathode plate, the separator, and the anode plate, the position information of the preset part includes a coating start angle $\theta 1$ and a coating end angle $\theta 2$ of the barrier layer, and the coating information includes a coating start signal and a coating end signal.

In this embodiment, the coating start signal and the coating end signal may be determined based on the coating start angle $\theta 1$ and the coating end angle $\theta 2$ of the barrier layer, and the overall winding angle $\theta$ of the cathode plate, the separator, and the anode plate, and the application of the barrier layer is accurately controlled based on the coating start signal and the coating end signal, so that automated application of the barrier layer can be accurately implemented.

In some embodiments, the preset post-winding position is one or both surfaces of the cathode plate, and/or one or both surfaces of the anode plate, and/or one or both surfaces of the separator.

In this embodiment, in all cases where the preset post-winding position is one or both surfaces of the cathode plate, and/or one or both surfaces of the anode plate, and/or one or both surfaces of the separator, some ions can be blocked, and the occurrence of lithium precipitation can be reduced.

In some embodiments, a bent region is formed after the cathode plate, the separator, and the anode plate are wound, and at least part of the preset post-winding position is provided on a surface of at least one of the cathode plate, the anode plate, and the separator in the bent region.

In this embodiment, during charging, the bent region is prone to lithium precipitation; at least part of the barrier layer is provided on the surface of the at least one of the cathode plate, the anode plate, and the separator in the bent region, and at least some ions de-intercalated from the cathode active material layer in the bent region are blocked by the barrier layer, so that the ions blocked by the barrier layer cannot be intercalated into the anode active material layer, in the bent region, of the anode plate adjacent to the cathode plate, thereby reducing the occurrence of lithium precipitation in the bent region, improving the safety performance of the battery cell, and prolonging the service life of the battery cell.

In some embodiments, at least part of the preset post-winding position is provided at a first-bent part and/or a second-bent part of the cathode plate in the bent region, and/or at least part of the preset post-winding position is provided at a first-bent part and/or a second-bent part of the anode plate, and/or at least part of the preset post-winding position is provided at a bent part of the separator that is adjacent to the first-bent part of the cathode plate and/or a bent part of the separator that is adjacent to the second-bent part of the cathode plate, and/or at least part of the preset post-winding position is provided at a bent part of the separator that is adjacent to the first-bent part of the anode plate and/or a bent part of the separator that is adjacent to the second-bent part of the anode plate.

In this embodiment, during charging, the anode plate that is adjacent to the first-bent part and the second-bent part of the cathode and/or the anode is prone to lithium precipitation; at least part of the preset post-winding position is provided at the first-bent part and/or the second-bent part of the cathode plate in the bent region, and/or at least part of the preset post-winding position is provided at the first-bent part and/or the second-bent part of the anode plate, and/or at least part of the preset post-winding position is provided at the bent part of the separator that is adjacent to the first-bent part of the cathode plate and/or the bent part of the separator that is adjacent to the second-bent part of the cathode plate, and/or at least part of the preset post-winding position is provided at the bent part of the separator that is adjacent to the first-bent part of the anode plate and/or the bent part of the separator that is adjacent to the second-bent part of the anode plate; and at least some ions de-intercalated from the cathode active material layer at the first-bent part of the cathode and the second-bent part of the cathode are blocked by the barrier layer, so that the ions blocked by the barrier layer cannot be intercalated into the anode active material layer, in the bent region, of the anode plate that is adjacent to the cathode plate, thereby reducing the occurrence of lithium precipitation on the anode plate adjacent to the first-bent part of the cathode and the second-bent part of the cathode, improving the safety performance of the battery cell, and prolonging the service life of the battery cell.

In some embodiments, the coating mechanism is configured to apply the adhesive on the preset part of the surface of the member to be coated, to form the barrier layer; and the coating mechanism includes:

an adhesive application portion configured to apply the adhesive on the preset part of the surface of the member to be coated; an adhesive supply mechanism configured to supply the adhesive to the adhesive application portion; and a driving mechanism configured to drive the adhesive application portion to press onto or leave the surface of the member to be coated, where the driving mechanism is communicatively connected to the coating control unit.

In this embodiment, the coating mechanism is provided to apply, by means of coating, the adhesive on the preset part of the surface of the member to be coated, to form the barrier layer; and the driving mechanism is configured to drive the adhesive application portion to press onto or leave the surface of the member to be coated, where the driving mechanism is communicatively connected to the coating control unit. The driving mechanism is controlled by the control unit to drive the adhesive application portion to press onto or leave the member to be coated, and an application position and an application area of the adhesive application can be controlled, so that the adhesive is accurately applied onto the preset part of the surface of the separator.

In some embodiments, the adhesive application portion is arranged on one side of the member to be coated, or there are a plurality of adhesive application portions, which are respectively arranged on two sides of the member to be coated.

In this embodiment, the adhesive application portion is arranged on one or both sides of the member to be coated, and the adhesive can be applied onto one or both surfaces of the member to be coated.

In some embodiments, an adsorption layer is provided on a side of the adhesive application portion facing the member to be coated, and the adsorption layer is in communication with the adhesive supply mechanism; or the adhesive application portion includes an adhesive roller, an adsorption layer covers in a circumferential direction of the adhesive roller, and the adsorption layer is in communication with the adhesive supply mechanism; and the adhesive roller is rotatably connected to the driving mechanism.

In this embodiment, the adhesive application portion may use a press coating method to directly press the adsorption layer onto the surface of the separator to apply the adhesive to the member to be coated; or the adhesive application portion may be in the form of the adhesive roller, the adsorption layer is provided in the circumferential direction of the adhesive roller, and when the adhesive roller is in contact with the separator, the adhesive roller rolls along the surface of the separator to apply the adhesive to the member to be coated.

In some embodiments, the coating mechanism is configured to apply the adhesive on the preset part of the surface of the member to be coated, to form the barrier layer; and the coating mechanism includes: a spray nozzle configured to apply the adhesive on the preset part of the surface of the member to be coated; an adhesive supply mechanism configured to supply the adhesive to the spray nozzle; and a control valve configured to connect the adhesive supply mechanism and the spray nozzle, where the control valve is communicatively connected to the coating control unit.

In this embodiment, the coating mechanism uses a spraying method, the control unit controls the spray nozzle, and an application position and an application area of the adhesive application can be controlled, so that the adhesive is accurately applied onto the preset part of the surface of the separator.

In some embodiments, the spray nozzle is arranged on one side of the separator; or there are a plurality of spray nozzles, which are respectively arranged on two sides of the separator.

In this embodiment, the spray nozzle is arranged on one side of the member to be coated, or there are a plurality of spray nozzles, which are respectively arranged on two sides of the member to be coated.

In this embodiment, the spray nozzle is arranged on one or both sides of the member to be coated, and the adhesive can be applied onto one or both surfaces of the member to be coated.

In some embodiments, the adhesive includes at least one of polyacrylic acid/acrylate, butyl benzene, phenylanine, ethylene-vinyl acetate copolymer, polypropylene, polyvinylidene fluoride, carboxymethyl cellulose, epoxy adhesive, silicone, polyurethane adhesive, styrene-isoprene-styrene copolymer adhesive, and modified materials thereof.

A third aspect of the present application provides an electrode assembly, processed using the processing method in the embodiment according to the first aspect.

A fourth aspect of the present application provides a battery cell, including: a shell, an electrolyte, a cover plate, and at least one electrode assembly in the embodiment according to the third aspect, where the shell has an accommodating cavity and an opening, and the electrode assembly and the electrolyte are accommodated in the accommodating cavity; and the cover plate is configured to seal the opening of the shell.

A fifth aspect of the present application provides a battery, including a case and at least one battery cell in the embodiment according to the fourth aspect, where the battery cell is accommodated in the case.

A sixth aspect of the present application provides a power consuming device. The power consuming apparatus is configured to receive power provided by the battery in the embodiment according to the fifth aspect.

The aforementioned description is only an overview of the technical solutions of the embodiments of the present application. In order to more clearly understand the technical means of the embodiments of the present application to implement same according to the contents of the description, and in order to make the aforementioned and other objectives, features and advantages of the embodiments of the present application more obvious and understandable, specific embodiments of the present application are exemplarily described below.

BRIEF DESCRIPTION OF THE DRAWINGS

In order to more clearly illustrate the technical solutions in the embodiments of the present application, the drawings to be used in the description of the embodiments of the present application will be described briefly below. Obviously, the drawings in the following description show merely some embodiments of the present application. For those of ordinary skill in the art, other drawings can also be obtained according to these drawings without the inventive labor.

FIG. 3 is a schematic flowchart of a processing method for an electrode assembly according to an embodiment of the present application;

FIG. 4 is a schematic flowchart of a processing method for an electrode assembly according to another embodiment of the present application;

FIG. 5 is a schematic structural diagram of another electrode assembly flat in shape after being unwound to a planar state according to another embodiment of the present application;

FIG. 23 is a schematic structural diagram of a cross-section of another electrode assembly flat in shape perpendicular to a winding axis according to another embodiment of the present application;

FIG. 24 is a schematic structural diagram of a processing apparatus for an electrode assembly according to an embodiment of the present application;

FIG. 25 is a schematic structural diagram of a processing apparatus for an electrode assembly according to another embodiment of the present application;

DETAILED DESCRIPTION OF EMBODIMENTS

Figures 1, 2:
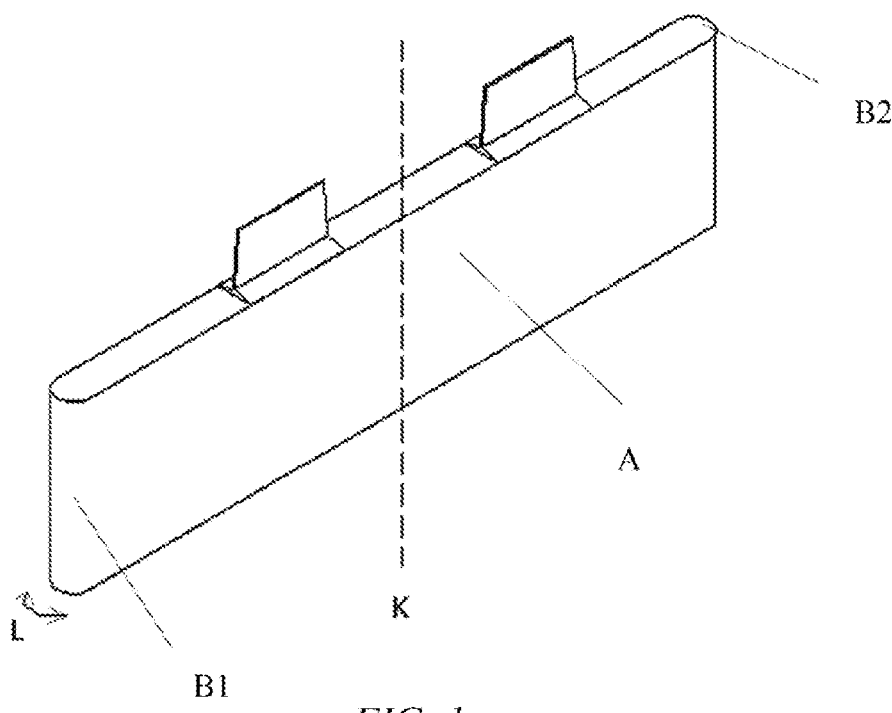
FIG. 1 is a schematic perspective view of a structure of an electrode assembly according to an embodiment of the present application.
FIG. 2 is a schematic structural diagram of a cross-section of the electrode assembly of FIG. 1 in a direction perpendicular to a winding axis K.

In order to make the objectives, technical solutions, and advantages of embodiments of the present application clearer, the technical solutions in the embodiments of the present application will be described clearly and completely below in conjunction with the accompanying drawings in the embodiments of the present application. Obviously, the embodiments described are some of, rather than all of, the embodiments of the present application. All the other embodiments obtained by those of ordinary skill in the art based on the embodiments of the present application without any creative effort shall fall within the scope of protection of the present application.

Unless otherwise defined, all technical and scientific terms used herein have the same meaning as those generally understood by those skilled in the art of the present application. The terms used in the description of the present application herein are merely for the purpose of describing specific embodiments, but are not intended to limit the present application. The terms "comprise/include" and "have" and any variations thereof in the specification and the claims of the present application as well as the foregoing description of the accompanying drawings are intended to cover a non-exclusive inclusion.

The "embodiment" mentioned herein means that a particular feature, structure, or characteristic described with reference to the embodiment can be included in at least one embodiment of the present application. This term appearing in various parts of the specification not necessarily refers to the same embodiment, nor an independent or alternative embodiment that is mutually exclusive to other embodiments. Those skilled in the art understand explicitly or implicitly that an embodiment described herein may be combined with another embodiment.

The term "and/or" herein is merely a description of the associated relationship of associated objects, and indicates that three relationships may exist. For example, A and/or B may indicate that the three instances of A alone, A and B simultaneously, and B alone. In addition, the character "/" herein generally indicates an "or" relationship between the associated objects.

In the description of the present application, it should be understood that the orientation or positional relationships indicated by the terms "center", "longitudinal", "transverse", "length", "width", "thickness", "upper", "lower", "front", "rear", "left", "right", "vertical", "horizontal", "top", "bottom", "inner", "outer", "clockwise", "anticlockwise", "axial", "radial", "circumferential", etc. are based on the orientation or positional relationships shown in the accompanying drawings and are merely for ease of description of the present application and simplification of the description, rather than indicating or implying that the devices or elements referred to must have a specific orientation or be constructed and operated in a described orientation, and therefore cannot be construed as limiting the present application. In addition, the terms "first", "second" and the like in the description and the claims of the present application or in the above drawings are used to distinguish different objects, rather than to describe a specific order. Therefore, a feature defined by "first" or "second" may explicitly or implicitly include one or more features. In the description of the present application, the term "a plurality of" means two or more, unless otherwise specified.

In the description of the present application, it should be noted that, the term "mount", "engage", and "connect" should be interpreted in the broad sense unless explicitly defined and limited otherwise, which, for example, may mean a fixed connection, a detachable connection or an integral connection; or may be a mechanical connection or an electrical connection; or may be a direct connection, an indirect connection by means of an intermediate medium, or internal communication between two elements. For those of ordinary skill in the art, the specific meaning of the terms mentioned above in the present application can be construed according to specific circumstances.

In order to make a lithium-ion battery smaller in size and higher in energy density, a cathode plate, an anode plate, and a separator in an electrode assembly of a lithium-ion battery may be wound and then compacted. For example, FIG. 1 is a schematic perspective view of a structure of an electrode assembly. The electrode assembly includes an anode plate 1, a cathode plate 2, a first separator 31, and a second separator 32, where the anode plate 1, the first separator 31, the cathode plate 2, and the second separator 32 are stacked axially from inside to outside and then wound around a winding axis K to form a wound structure. The separator is an insulating film configured to separate the anode plate 1 from the cathode plate 2 to prevent the anode plate 1 and the cathode plate 2 from being short-circuited. The wound structure of the electrode assembly is flat in shape, and a schematic structural diagram of a cross-section of the electrode assembly in a direction perpendicular to the winding axis K may be as shown in FIG. 2.

With reference to FIGS. 1 and 2, the electrode assembly includes a flat region A, and a first bent region B1 and a second bent region B2 located at two ends of the flat region A. The flat region A is a region in the wound structure having a parallel structure. To be specific, the anode plate 1, the first separator 31, the cathode plate 2, and the second separator 32 in the flat region A are substantially parallel to each other, that is, surfaces of the anode plate 1, the first separator 31, the cathode plate 2, and the second separator 32 in each layer of the electrode assembly in the flat region A are all substantially flat surfaces. The first bent region B1 and the second bent region B2 are regions in the wound structure having bent structures. To be specific, the anode plate 1, the first separator 31, the cathode plate 2, and the second separator 32 in the first bent region B1 and the second bent region B2 are all bent, that is, surfaces of the anode plate 1, the first separator 31, the cathode plate 2, and the second separator 32 in each layer of the electrode assembly in the bent region 200 are all curved surfaces. The first bent region B1 and the second bent region B2 each have a bending direction L. The bending direction L can be understood as a direction pointing to the flat region along the surface of the electrode assembly in the bent region. For example, the bending direction L is a winding direction of the wound structure in the bent region 200.

The surface of the anode plate 1 is provided with an anode active material layer made of an anode active material, and the surface of the cathode plate 2 is provided with a cathode active material layer made of a cathode active material. For example, the cathode active material may be lithium manganate, lithium cobaltate, lithium iron phosphate, or lithium nickel-cobalt manganate, and the anode active material may be graphite or silicon.

When a lithium-ion battery is being charged, lithium ions are de-intercalated from the cathode and intercalated into the anode. However, some anomalies may occur. For example, due to an insufficient lithium intercalation space of the anode, and a too high resistance for lithium ions to be intercalated into the anode or a too fast speed at which lithium ions are de-intercalated from the cathode, the de-intercalated lithium ions cannot be intercalated into the anode active material layer of the anode plate in an equal amount. The lithium ions that cannot be intercalated into the anode plate can gain electrons only on the surface of the anode, thereby forming pure silver-white metallic lithium, which is lithium precipitation. Lithium precipitation not only reduces the performance of the lithium-ion battery and greatly shortens the cycle life, but also limits a fast charging capacity of the lithium-ion battery. In addition, when lithium precipitation occurs in the lithium-ion battery, the precipitated lithium metal is very active to react with an electrolyte at a low temperature, resulting in a decrease in a self-heating onset temperature (Tonset) of the battery and an increase in a self-heating rate, which seriously endangers the safety of the battery. Moreover, when the lithium precipitation is severe, the de-intercalated lithium ions may form lithium crystals on the surface of the anode plate, and the lithium crystals easily pierce the separator, resulting in a risk of short circuit between an adjacent cathode plate and anode plate. The adjacent cathode plate and anode plate mean that one layer of cathode plate and one layer of anode plate in the electrode assembly are adjacent to each other, without another layer of cathode plate or another layer of anode plate therebetween. A separator adjacent to the cathode plate 2 means that one layer of cathode plate 2 and one layer of separator in the electrode assembly are adjacent to each other, without another layer of separator or anode plate 1 therebetween. A separator adjacent to the anode plate 1 means that one layer of anode plate 1 and one layer of separator in the electrode assembly are adjacent to each other, without another layer of separator or cathode plate 2 therebetween.

During the research and development, the inventors found that lithium precipitation often occurs in a bent region of an electrode assembly. Through further research, the inventors found that the lithium precipitation is caused by the exfoliation of an active material. An anode active material is applied on a surface of an anode plate, and a cathode active material is applied on a surface of a cathode plate. The cathode plate and the anode plate in a bent region are bent, and this may cause the exfoliation of their respective active materials, which is referred to as powder dropping. In particular, the innermost layer of plate in the bent region is bent most and is more prone to the exfoliation of the active material. Due to the exfoliation of the active material, especially the exfoliation of the active material from the anode plate, the number of lithium intercalation sites of the anode active material layer of the anode plate may be less than the number of lithium ions that can be provided by the cathode active material layer of the adjacent cathode plate. Therefore, lithium precipitation easily occurs when the lithium battery is being charged.

In view of this, as shown in FIG. 3, which is a schematic flowchart of a processing method for an electrode assembly according to an embodiment of the present application, the present application is to provide a processing method for an electrode assembly. The electrode assembly includes a cathode plate, an anode plate, and a separator. The separator is configured to separate the cathode plate from the anode plate. The electrode assembly is formed by winding the cathode plate, the separator, and the anode plate. The cathode plate includes a cathode active material layer, and the anode plate includes an anode active material layer. The method according to this embodiment includes:

S04: applying an adhesive on a preset part of a surface of a member to be coated, the adhesive forming a barrier layer, and the member to be coated including at least one of a cathode plate, a separator, and an anode plate; and S05: winding the cathode plate, the anode plate, and the separator to form the electrode assembly, where the barrier layer is located between the cathode active material layer and the anode active material layer adjacent to each other after the winding, and the barrier layer is configured to block at least some ions de-intercalated from the cathode active material layer located on one side of the barrier layer from being intercalated into the anode active material layer located on the other side of the barrier layer.

The adhesive is applied on the preset part of the surface of the member to be coated, the adhesive forming the barrier layer. The barrier layer can be conveniently formed, which facilitates improving the manufacturing efficiency. The preset part corresponds to a part of the anode active material layer that is prone to lithium precipitation. During charging, at least some ions de-intercalated from the cathode active material layer are blocked by the barrier layer, so that the ions blocked by the barrier layer cannot be de-intercalated from the cathode active material layer or intercalated into the anode active material layer adjacent to the cathode active material layer, thereby reducing the occurrence of lithium precipitation at the part of the anode plate that is prone to lithium precipitation, improving the safety performance of a battery cell, and prolonging the service life of the battery cell. Applying the adhesive to form the barrier layer facilitates manufacturing and processing, so that manufacturing efficiency can be improved. The member to be coated may include at least one of the cathode plate, the separator, and the anode plate.

As shown in FIG. 4, in a processing method according to another embodiment of the present application, before step S03, in FIG. 3, of applying an adhesive on a preset part of a surface of a member to be coated, the adhesive forming a barrier layer, the method further includes:

S01: determining position information of the preset part based on a preset post-winding position, where the preset post-winding position is a position of the barrier layer in the electrode assembly after the winding, and is located between the cathode active material layer and the anode active material layer adjacent to each other, and the position information of the preset part includes information for characterizing a coating start point position and coating end point position of the barrier layer;

S02: winding a cathode plate 2, an anode plate 1, a first separator 31, and a second separator 32 that have not been coated; and S03: obtaining winding data of the cathode plate, the separator, and the anode plate, and determining coating information based on the winding data and the position information of the preset part.

Then, step S04 of applying an adhesive on a preset part of a surface of a member to be coated includes:

S041: applying, based on the coating information, the adhesive on the preset part of the surface of the member to be coated.

Step S02 may be performed before step S01, or after step S01, or synchronously with step S01.

In some embodiments, in step S01, first, the position information of the preset part is determined based on the preset post-winding position. The preset post-winding position is a desired position of the barrier layer in the electrode assembly after the winding, and corresponds to a part of the anode active material layer that is prone to lithium precipitation. For example, the preset post-winding position may be the first bent region B1 and the second bent region B2 of the electrode assembly after the winding, or the preset post-winding position may be the first bent region B1 and the second bent region B2 of the electrode assembly after the winding plus part of the flat region A. The preset post-winding position is located between the cathode active material layer and the anode active material layer adjacent to each other.

In some embodiments, the position information of the preset part includes information for characterizing a coating start point position and a coating end point position of the barrier layer.

In this embodiment, as shown in a schematic diagram in FIG. 5 of the electrode assembly after being unwound to a planar state, the position information of the preset part may include a coating start point length L1 and a coating end point length L2 of a barrier layer 7. The coating start point length L1 of the barrier layer 7 is defined as, assuming that the cathode plate 2, the anode plate 1, the first separator 31, and the second separator 32 that are wound are unwound as a whole to a planar state, a distance between a start point of the barrier layer 7 in a length direction of the member to be coated and the farthest initial winding end of the cathode plate 2, the anode plate 1, the first separator 31, and the second separator 32, and in some embodiments, is a distance between the start point of the barrier layer 7 in the length direction of the member to be coated and the farthest initial winding end 30 of the first separator 31 or the second separator 32. The coating end point length L2 of the barrier layer 7 is defined as, assuming that the cathode plate 2, the anode plate 1, the first separator 31, and the second separator 32 that are wound are unwound onto the same plane, a distance between an end point of the barrier layer 7 in the length direction of the member to be coated and the farthest initial winding end of the cathode plate 2, the anode plate 1, the first separator 31, and the second separator 32, and in some embodiments, is a distance between the end point of the barrier layer 7 in the length direction of the member to be coated and the farthest initial winding end 30 of the first separator 31 or the second separator 32. The barrier layer 7 may be provided on one surface or two opposite surfaces of the member to be coated, and one or more segments of the barrier layer 7 may be provided on each surface. Then the position information of the preset part may include position information of each segment of the barrier layer 7 on each surface of the member to be coated. FIG. 5 shows an unwound structure of the barrier layer 7 provided on the cathode plate 2. When the barrier layer 7 is provided on the anode plate 1, the first separator 31, or the second separator 32, reference may also be made to the manner of FIG. 5 for the coating start point length L1 and the coating end point length L2 of the barrier layer 7.

Step S02 in this embodiment includes winding the cathode plate 2, the anode plate 1, the first separator 31, and the second separator 32 that have not been coated. In some embodiments, start ends of the cathode plate 2, the anode plate 1, the first separator 31, and the second separator 32 that have not been coated are placed into a winding device, to obtain corresponding winding data. In some embodiments, with reference to FIG. 2, it can be seen that positions of a winding start end 20 of the cathode plate 2 and a winding start end 10 of the anode plate 1 are different from those of winding start ends 10 of the first separator 31 and the second separator 32. Lengths of the winding start ends 30 of the first separator 31 and the second separator 32 are greater than those of the winding start end 20 of the cathode plate 2 and the winding start end 10 of the anode plate 1, that is, the first separator 31 and the second separator 32 have already been partially wound before the cathode plate 2 and the anode plate 1 are wound. In some embodiments, positions of the winding start end 20 of the cathode plate 2 and the winding start end 10 of the anode plate 1 are also different. However, the positions of the winding start ends of the cathode plate 2, the anode plate 1, the first separator 31, and the second separator 32 are not limited to those in the embodiments in FIGS. 2 and 5.

In step S03 of this embodiment, the winding data of the member to be coated is obtained, and the coating information is determined based on the winding data and the position information of the preset part.

In some embodiments, the winding data includes a winding linear velocity V of the member to be coated. The winding linear velocity V is a motion velocity of the member to be coated at the entrance to a winding roller. The winding linear velocity V may be a preset velocity value. In some embodiments, the winding linear velocity V may be a fixed value.

Correspondingly, in this embodiment, the coating information includes a coating start time T1 and a coating end time T2. In some embodiments, when there are a plurality of segments of the barrier layer 7, the coating information includes coating information of each segment of the barrier layer 7. When the barrier layer 7 is provided on two different surfaces of the member to be coated, the coating information includes coating information on each surface.

In this embodiment, the coating information is determined based on the winding data and the position information of the preset part as follows: the coating start time T1 and the coating end time T2 are determined based on the winding linear velocity V of the member to be coated and the coating start point length L1 and the coating end point length L2 of the barrier layer 7.

A specific determination method is as follows: The coating start time T1 may be a time from the start of a winding action to the start of coating the member to be coated. In some embodiments, $T1=L1/V$, that is, the coating start time T1 is equal to a ratio of the start point length L1, in the coating information, of the barrier layer 7 on the surface of the member to be coated to the winding linear velocity V. The coating end time T2 depends on a length of the barrier layer 7 (a difference between the start point length L1 and the end point length L2), the winding linear velocity V of the member to be coated, and a coating length H of the coating mechanism. In some embodiments, $T2=T1+(L2-L1-H)/V$, that is, a difference between the coating end time T2 and the coating start time T1 is a value obtained by dividing a difference between the length of the barrier layer 7 and the coating length H of the coating apparatus by the winding linear velocity V. A specific structure of the coating mechanism is further described in subsequent embodiments.

In step S04 of the foregoing embodiment, step S04 of applying an adhesive on a preset part of a surface of a member to be coated includes: S041: applying, based on the coating information, the adhesive on the preset part of the surface of the member to be coated.

In the foregoing embodiment, when the coating information includes the coating start time T1 and the coating end time T2, step S041 is coating the member to be coated based on the coating start time T1 and the coating end time T2, to form the barrier layer 7 at the preset post-winding position. In some embodiments, when the coating start time T1 arrives, the coating mechanism applies the adhesive at the position of the preset part of the surface of the member to be coated; and when the coating end time T2 arrives, the coating mechanism stops applying the adhesive at the position of the preset part of the surface of the member to be coated, and a segment of the barrier layer 7 is formed at the preset part of the coated surface. When there are a plurality of segments of the barrier layer 7 on the surface of the member to be coated, the coating information includes a plurality of groups of coating start times T1 and coating end times T2, and the plurality of segments of the barrier layer 7 are formed after the coating mechanism performs coating a plurality of times.

In some other embodiments, in step S01, the position information of the preset part may include a coating start angle θ1 and a coating end angle θ2. The coating start angle θ1 is equal to an angle by which a winding mechanism rotates when a start point of the barrier layer 7 reaches the coating mechanism. The coating end angle θ2 is equal to an angle by which the winding mechanism rotates when an end point of the barrier layer 7 reaches the coating mechanism. In some embodiments, when there are a plurality of segments of the barrier layer 7, the position information of the preset part includes position information of a preset part of each segment of the barrier layer 7. When the barrier layer 7 is provided on two different surfaces of the member to be coated, information about the preset part includes position information of a preset part on each surface.

In this embodiment, in step S03, the winding data includes an overall winding angle θ of the cathode plate, the separator, and the anode plate, and it is defined that the overall winding angle θ is 0 when the farthest initial winding end of the first separator 31 or the second separator 32 is wound to the winding mechanism. A specific structure of the winding mechanism is described in subsequent embodiments. The overall winding angle θ increases continuously as the cathode plate 2, the anode plate 1, the first separator 31, and the second separator 32 are continuously wound.

In this embodiment, the coating information includes a coating start signal and a coating end signal.

In this embodiment, in step S03, the coating information is determined based on the winding data and the position information of the preset part as follows: the coating start signal and the coating end signal are determined based on the overall winding angle θ, the coating start angle θ1, and the coating end angle θ2.

A specific method is as follows: When the overall winding angle θ reaches the coating start angle θ1, the coating information is the coating start signal; and when the overall winding angle θ reaches the coating end angle θ2, the coating information is the coating end signal. In some embodiments, when there are a plurality of segments of the barrier layer 7, the coating information includes coating information of each segment of the barrier layer 7. When the barrier layer 7 is provided on two different surfaces of the member to be coated, the coating information includes coating information on each surface.

In this embodiment, when the coating information includes the coating start signal and the coating end signal, step S041 is coating the member to be coated based on the coating start signal and the coating end signal, to form the barrier layer 7 at the preset post-winding position. When the coating information is the coating start signal, the coating mechanism applies the adhesive at the position of the preset part of the surface of the member to be coated; and when the coating information is the coating end signal, the coating mechanism stops applying the adhesive at the position of the preset part of the surface of the member to be coated, and a segment of the barrier layer 7 is formed at the preset part of the coated surface. When there are a plurality of segments of the barrier layer 7 on the surface of the member to be coated, the coating information includes a plurality of groups of coating start signals and coating end signals, and the plurality of segments of the barrier layer 7 are formed on the member to be coated after the coating mechanism performs coating a plurality of times.

In the foregoing embodiment, the cathode plate 2, the anode plate 1, the first separator 31, and the second separator 32 that have not been coated are wound, then the winding data is obtained, and an application position of the barrier layer 7 is determined based on the position of the preset part, so that automated application of the barrier layer 7 can be implemented, and the applied barrier layer 7 is formed at the preset post-winding position after the winding, to block ions at the preset post-winding position in a targeted manner, thereby reducing the occurrence of lithium precipitation. The formation of the barrier layer 7 can be performed synchronously with a winding action, so that application of the barrier layer 7 can be accurately implemented.

In some embodiments, the preset post-winding position is one or both surfaces of the cathode plate 2, and/or one or both surfaces of the anode plate 1, and/or one or both surfaces of the first separator 31 or the second separator 32.

In all cases where the preset post-winding position is one or both surfaces of the cathode plate 2, and/or one or both surfaces of the anode plate 1, and/or one or both surfaces of the first separator 31 or the second separator 32, some ions can be blocked, and the occurrence of lithium precipitation can be reduced. The preset post-winding position may be a position of the electrode assembly that is prone to lithium precipitation after the winding. The barrier layer 7 is formed at the preset post-winding position, so that the ions blocked by the barrier layer 7 cannot be intercalated into the anode active material layer adjacent to the cathode active material layer, thereby reducing the occurrence of lithium precipitation at the part of the anode plate that is prone to lithium precipitation, improving the safety performance of the battery cell, and prolonging the service life of the battery cell.

In some embodiments, the cathode plate 2, the first separator 31, the second separator 32, and the anode plate 1 are wound to form the first bent region B1 and the second bent region B2. At least part of the preset post-winding position is provided on a surface of at least one of the cathode plate 2, the anode plate 1, the first separator 31, and the second separator 32 in the first bent region B1 and the second bent region B2. The exfoliation of the active material more easily occurs on the cathode plate 2 and the anode plate 1 in the bent region due to their large bending degrees. Due to the exfoliation of the active material, especially the exfoliation of the active material from the anode plate 1, the number of lithium intercalation sites of the anode active material layer of the anode plate 1 may be less than the number of lithium ions that can be provided by the cathode active material layer of the adjacent cathode plate 2. Therefore, lithium precipitation easily occurs when the lithium battery is being charged. Therefore, providing the barrier layer 7 on the surface of at least one of the cathode plate 2, the anode plate 1, the first separator 31, and the second separator 32 in the first bent region B1 and the second bent region B2 can effectively suppress the occurrence of lithium precipitation.

Figure 6:
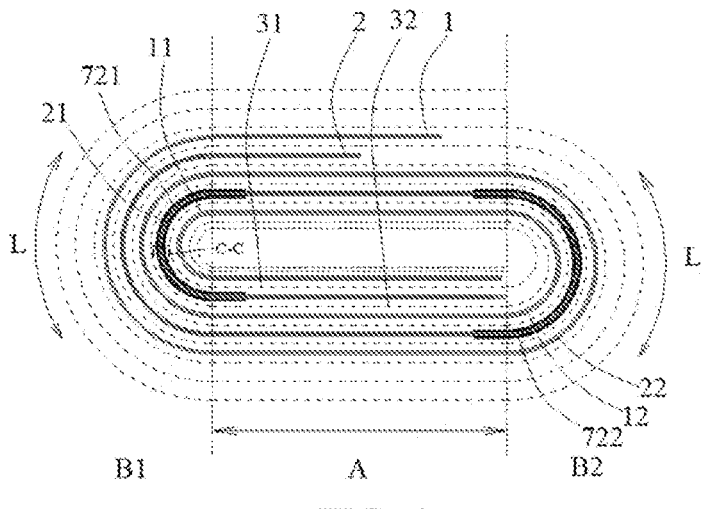
FIG. 6 is a schematic structural diagram of a cross-section of another electrode assembly flat in shape perpendicular to a winding axis according to another embodiment of the present application.
Figure 7:
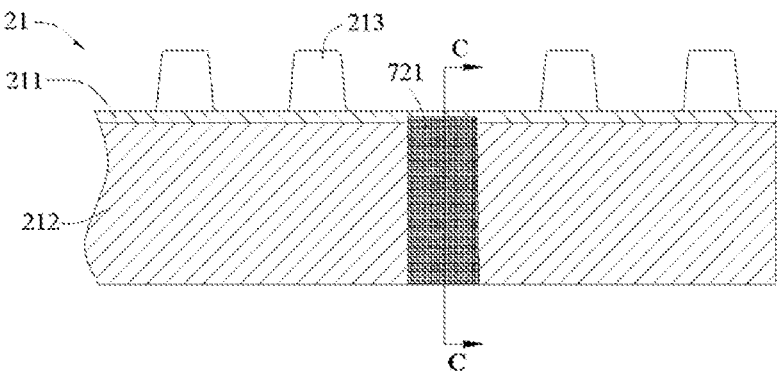
FIG. 7 is a schematic structural diagram of an anode plate according to another embodiment of the present application.
Figure 8:
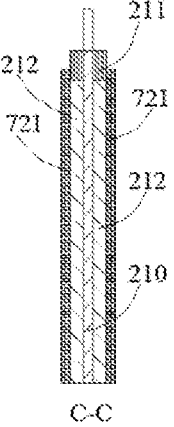
FIG. 8 is a schematic structural diagram of a section along direction C-C in FIG. 7.

As shown in FIGS. 6 to 8, in another embodiment of the present application, the member to be coated is two surfaces of the cathode plate 2, and step S03 is applying the adhesive at preset positions of the two surfaces of the cathode plate 2, the adhesive forming a barrier layer. After step S04 of winding the cathode plate 2, the anode plate 1, the first separator 31, and the second separator 32 to form the electrode assembly, the formed electrode assembly is as shown in FIG. 6.

As shown in FIG. 6, in an embodiment of the present application, the electrode assembly includes a flat region A, and a first bent region B1 and a second bent region B2 that join two ends of the flat region. For brevity of description, the electrode assembly in this embodiment is described by taking the electrode assembly having a wound structure flat in shape as an example. For example, structures of the first bent region B1, the second bent region B2, and the flat region A in the wound structure flat in shape may be as shown in FIG. 6, which is a schematic diagram of a preset structure of an electrode assembly in its bent region according to an embodiment of the present application. The electrode assembly, in its bent region A, includes the cathode plate 2, the anode plate 1, and the first separator 31 and the second separator 32 configured to separate the cathode plate 2 from the anode plate 1. The first separator 31 and the second separator 32 may be independently provided between the cathode plate 2 and the anode plate 1 adjacent to each other, or may be applied on surfaces of the cathode plate 2 or the anode plate 1. In another embodiment of the present application, one anode plate 1, one separator 31, one cathode plate 2, and another separator 32 may be stacked and then wound or folded, or at least one (e.g., two or more) cathode plate 2, at least one (e.g., two or more) anode plate 1, and at least two first separators 31 and second separators 32 (e.g., four or more, with the number of the first separators 31 and the second separators 32 being twice the number of the cathode plates 2 or the anode plates 1) may be stacked and then wound or folded, to form the first bent region B1 and the second bent region B2. When the electrode assembly, in the first bent region B1 and the second bent region B2, has a plurality of layers of cathode plates 2, a plurality of layers of anode plates 1, and a plurality of layers of first separators 31 and second separators 32, the first bent region B1 and the second bent region B2 each include a structure in which the cathode plate 2, the separator 3, and the anode plate 1 are alternately distributed. The preset post-winding position is provided on one or both surfaces of the cathode plate 2, and/or one or both surfaces of the anode plate 1, and/or one or both surfaces of at least one of the two first separators 31 or second separators 32. By such provision, the barrier layer is included between at least one layer of cathode plate 2 and at least one layer of anode plate 1 adjacent to each other. The adjacent cathode plate 2 and anode plate 1 in the first bent region B1 and the second bent region B2 mean that one layer of cathode plate 2 and one layer of anode plate 1 in the first bent region B1 and the second bent region B2 are adjacent to each other, without another layer of cathode plate 2 or another layer of anode plate 1 therebetween. A separator adjacent to the cathode plate 2 means that one layer of cathode plate 2 and one layer of separator in the electrode assembly are adjacent to each other, without another layer of separator or anode plate 1 therebetween. A separator adjacent to the anode plate 1 means that one layer of anode plate 1 and one layer of separator in the electrode assembly are adjacent to each other, without another layer of separator or cathode plate 2 therebetween.

When the electrode assembly has the wound structure, a width direction of the cathode plate 2 and the anode plate 1 is parallel to the direction of the winding axis, and the width direction of the cathode plate 2 and the anode plate 1 is parallel to a direction perpendicular to the bending direction L. For ease of the subsequent description, in this embodiment, the width direction of the cathode plate 2 and the anode plate 1, the direction perpendicular to the bending direction L, and the direction of the winding axis are collectively referred to as a direction K.

In some embodiments, the cathode plate 2, the first separator 31, the second separator 32, and the anode plate 1 are wound to form the first bent region B1 and the second bent region B2. At least part of the preset post-winding position is provided in the first bent region B1 and the second bent region B2 along the surface of at least one of the cathode plate 2, the anode plate 1, or the first separator 31 and the second separator 32. In other words, the barrier layer is at least partially applied on one or both surfaces of the cathode plate 2 in the first bent region B1 and the second bent region B2, and/or attached to one or both surfaces of the anode plate 1 in the first bent region B1 and the second bent region B2, and/or attached to one or both surfaces of at least one of the two separators in the first bent region B1 and the second bent region B2.

In this embodiment, in the first bent region B1 and the second bent region B2, there is a large gap between the cathode plate 2 and the anode plate 1. At least part of the barrier layer is provided in the first bent region B1 and the second bent region B2 along the surface of at least one of the cathode plate 2, the anode plate 1, or the first separator 31 and the second separator 32, that is, the barrier layer is provided in the first bent region B1 and the second bent region B2 after the winding. The exfoliation of the active material more easily occurs on the cathode plate 2 and the anode plate 1 in the bent region due to their large bending degrees. Due to the exfoliation of the active material, especially the exfoliation of the active material from the anode plate 1, the number of lithium intercalation sites of the anode active material layer of the anode plate 1 may be less than the number of lithium ions that can be provided by the cathode active material layer of the adjacent cathode plate 2. Therefore, lithium precipitation easily occurs when the lithium battery is being charged. Therefore, providing at least part of the preset post-winding position in the first bent region B1 and the second bent region B2 along the surface of at least one of the cathode plate 2, the anode plate 1, or the first separator 31 and the second separator 32 can effectively suppress the occurrence of lithium precipitation.

In another embodiment of the present application, both ends of the preset post-winding position extending along the bending direction L are located in the first bent region B1 and the second bent region B2, that is, the barrier layer is all located in the first bent region B1 and the second bent region B2. In this embodiment, the electrode assembly further includes the flat region A that joins the first bent region B1 and the second bent region B2, the bending direction L is a direction along the curved surfaces of the first bent region B1 and the second bent region B2 and toward the flat region A, and the direction perpendicular to the bending direction L is a direction perpendicular to the bending direction L.

In another embodiment of the present application, one end of the preset post-winding position extending along the bending direction L is located in the flat region A, and the other end thereof is located in the first bent region B1 and the second bent region B2.

In another embodiment of the present application, to improve performance of the bent region in blocking lithium ions, an area of the preset post-winding position in the first bent region B1 and the second bent region B2 should be as large as possible. For example, both ends of the preset post-winding position extending along the bending direction L are located in the flat region A, that is, the barrier layer is not only located in the first bent region B1 and the second bent region B2, but also extends further to the flat region A.

In another embodiment of the present application, both ends of the preset post-winding position extending along the bending direction L are located at boundaries between the flat region A, and the first bent region B1 and the second bent region B2, or both ends of the preset post-winding position extending along the bending direction L are close to the boundaries between the flat region A, and the first bent region B1 and the second bent region B2.

In some embodiments, at least part of the preset post-winding position is provided at a first-bent part 21 and/or a second-bent part 22 of the cathode plate 2 in the first bent region B1 and the second bent region B2, and/or at least part of the preset post-winding position is provided at a first-bent part 11 and/or a second-bent part 12 of the anode plate 1, and/or at least part of the preset post-winding position is provided at bent parts of the first separator 31 and the second separator 32 that are adjacent to the first-bent part 21 of the cathode plate 2 and/or bent parts of the first separator 31 and the second separator 32 that are adjacent to the second-bent part 22 of the cathode plate, and/or at least part of the preset post-winding position is provided at bent parts of the first separator 31 and the second separator 32 that are adjacent to the first-bent part 11 of the anode plate 1 and/or bent parts of the first separator 31 and the second separator 32 that are adjacent to the second-bent part 12 of the anode plate.

As shown in the embodiment in FIG. 6, at least part of the preset post-winding position may be provided at bent parts corresponding to predetermined bends of at least one of the cathode plate 2, the anode plate 1, the first separator 31, and the second separator 32 in the first bent region B1 and the second bent region B2. In some embodiments, the preset post-winding position is provided at bent parts corresponding to at least the first and second bends of at least one of the cathode plate 2, the anode plate 1, the first separator 31, and the second separator 32 in the first bent region B1 and the second bent region B2. The predetermined bends mentioned in this embodiment are bends arranged in order in the process of winding the cathode plate 2, the first separator 31, the second separator 32, and the anode plate 1 from inside to outside to form the electrode assembly. Taking the embodiment of FIG. 6 as an example, for the cathode plate 2, a position of a first barrier layer 721 is an inner surface and an outer surface of the first-bent part 21 of the cathode plate 2, and a position of a second barrier layer 722 is an inner surface and an outer surface of the second-bent part 22 of the cathode plate 2, that is, the preset post-winding position includes the first-bent part 21 of the cathode plate 2 and the second-bent part 22 of the cathode plate 2, and so on. However, the predetermined bends of the cathode plate, the anode plate, and the separator are not limited to the first and second bends, and a range of any number of bends may be selected as required. For example, the preset post-winding position may be provided at bent parts corresponding to the first and fourth or first and sixth or first and eighth bends, or the third and fourth or third and sixth or third and eighth bends, or another bend range of the cathode plate 2 in the bent region, and/or the preset post-winding position is provided at bent parts corresponding to the first and fourth or first and sixth or first and eighth bends, or the third and fourth or third and sixth or third and eighth bends, or another bend range of the anode plate 1 in the bent region, and/or the preset post-winding position is provided at bent parts corresponding to the first and fourth or first and sixth or first and eighth bends, or the third and fourth or third and sixth or third and eighth bends, or another bend range of the first separator 31 and/or the second separator 32 in the bent region.

In this embodiment, the preset post-winding position is provided at the bent parts corresponding to the predetermined bends of at least one of the cathode plate 2, the anode plate 1, and the separators 32 and 32, and barrier layers can be formed at the predetermined bent parts between the cathode plate 2 and the anode plate 1 that are most prone to lithium precipitation. For example, barrier layers are formed at the first- and second-bent parts having the largest curvatures, and only lithium ions at the first- and second-bent parts having the largest curvatures are blocked, so that no lithium ions or a small number of lithium ions are intercalated into parts of the anode plate having the largest curvatures, thereby reducing the occurrence of lithium precipitation.

An embodiment as shown in FIG. 7 is a schematic structural diagram of the cathode plate 2 in FIG. 6 after being unwound. The cathode plate 2 includes a cathode body portion 21 and at least one cathode tab portion 213 extending toward the outside of the cathode body portion 21 in the direction K. At least part of the region of a surface of the cathode body portion 21 is a cathode active material region 212, and the cathode active material region 212 may be coated with a cathode active material. For example, the cathode active material may be a ternary material, lithium manganate, or lithium iron phosphate.

In another embodiment of the present application, the surface of the cathode body portion 21 further includes a first insulation layer coating region 211 adjacent to the cathode active material region 212, the first insulation layer coating region 211 is located on one side of the cathode active material region 212 adjacent to the cathode tab portion 213, and the first insulation layer coating region 211 is configured to be coated with an insulation material for insulation and isolation of the cathode active material region 212 from the cathode tab portion 213. For example, FIG. 7 is a schematic structural diagram of a section along direction E-E in FIG. 6. Both surfaces of a current collector 210 of the cathode plate 2 have the cathode active material regions 212, and the cathode tab portion 213 is part of the current collector 210 of the cathode plate 2, where the current collector 210 may be made of aluminum.

For example, the cathode active material region 212 and the first insulation layer coating region 211 are distributed at two ends on the surface of the cathode body portion 21 along a width direction (e.g., the direction K) of the cathode body portion 21, and the cathode tab portion 213 and the first insulation layer coating region 211 are located at the same end of the cathode body portion 21.

In another embodiment of the present application, the cathode active material region 212 and the first insulation layer coating region 211 are two substantially parallel regions on the surface of the cathode body portion 21, and are distributed in two layers on the surface of the cathode body portion 21 along the direction K.

In another embodiment of the present application, the first insulation layer coating region 211 may be located at a portion where the cathode body portion 21 and the cathode tab portion 213 are connected to each other. For example, the first insulation layer coating region 211 is located at a portion on the surface of the cathode body portion 21 where the cathode body portion and the cathode tab portion 213 are connected to each other, and configured to separate the surface of the cathode tab portion 213 from the cathode active material region 212. In another embodiment of the present application, not only the surface of the cathode body portion 21 is provided with the first insulation layer coating region 211, but also a root region of the cathode tab portion 213 close to the cathode body portion 21 is provided with a second insulation layer coating region configured to be coated with an insulation layer material.

In another embodiment of the present application, the surface of the first insulation layer coating region 211 is coated with an insulation material including an inorganic filler and a binder. The inorganic filler includes one or more of boehmite, aluminum oxide, magnesium oxide, titanium oxide, zirconium oxide, silicon dioxide, silicon carbide, boron carbide, calcium carbonate, aluminum silicate, calcium silicate, potassium titanate, and barium sulfate. The binder includes one or more of polyvinylidene fluoride, polyacrylonitrile, polyacrylic acid, polyacrylate, polyacrylic acid-acrylate, polyacrylonitrile-acrylic acid, and polyacrylonitrile-acrylate.

In another embodiment of the present application, each cathode plate 2 may include one or two or more cathode tab portions 213. When the cathode plate 2 includes two or more cathode tab portions 213, all the cathode tab portions 213 are located on the same side of the cathode plate 2 along the direction K.

FIG. 8 is a schematic structural diagram of a section along direction C-C in FIG. 7. With reference to FIG. 7, the barrier layer 721 is attached to the surface of the cathode active material region 212, that is, the surface of the cathode active material layer. At least one surface of the cathode plate 2 is coated with the barrier layer, so that the passage of a large number of lithium ions can be blocked, thereby reducing the occurrence of lithium precipitation. In FIG. 8, the barrier layers 721 are provided on both surfaces of each cathode plate 2, that is, the cathode active material regions 212 on both surfaces of the cathode plate 2 are coated with the barrier layers 721.

In some embodiments, the barrier layer adhesive includes at least one of polyacrylic acid/acrylate, butyl benzene, phenylanine, ethylene-vinyl acetate copolymer, polypropylene, polyvinylidene fluoride, carboxymethyl cellulose, epoxy adhesive, silicone, polyurethane adhesive, styrene-isoprene-styrene copolymer adhesive, and modified materials thereof.

The foregoing embodiments only briefly describe the positional relationship between the barrier layer and the cathode plate, the anode plate, and the separator, as well as the structural characteristics of the barrier layer. To make the positional relationship between the barrier layer and the cathode plate, the anode plate, and the separator, as well as the structural characteristics of the barrier layer clearer, a detailed description is provided below with several electrode assemblies having a wound structure.

Figure 9:
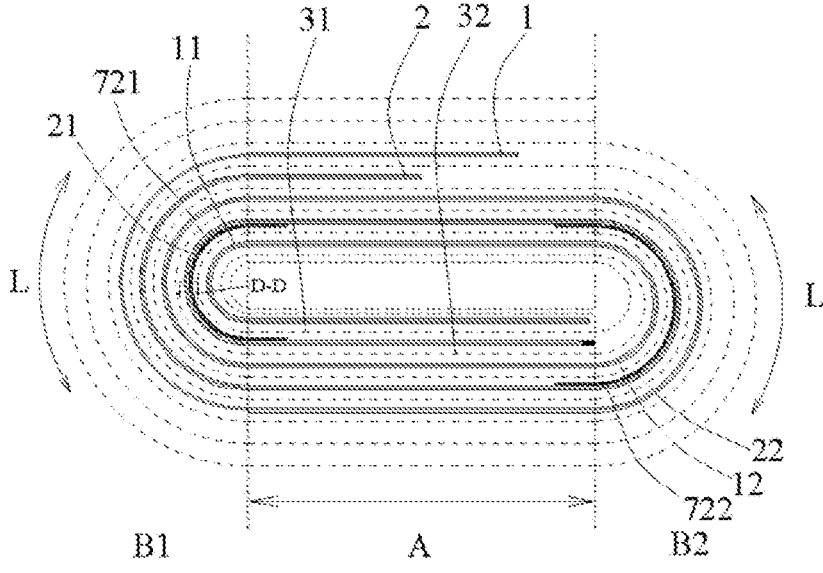
FIG. 9 is a schematic structural diagram of a cross-section of another electrode assembly flat in shape perpendicular to a winding axis according to another embodiment of the present application.

In another embodiment as shown in FIG. 9, for the related technical features of the anode plate 2, the cathode plate 1, the first separator 31, the second separator 32, and the barrier layers 721 and 722 in this embodiment, reference may be made to the foregoing descriptions of the embodiments corresponding to FIGS. 6 to 8, and details are not described herein again.

A difference between the embodiment of FIG. 9 and the embodiment of FIG. 6 lies in that the preset post-winding position includes the inner surface of the first-bent part 21 of the cathode plate 2 and the inner surface of the second-bent part 22 of the cathode plate 2. That is, the first barrier layer 721 formed after the winding is provided on the inner surface of the first-bent part 21 of the cathode plate 2, and the second barrier layer 722 is provided on the inner surface of the second-bent part 22 of the cathode plate 2.

Figure 10:
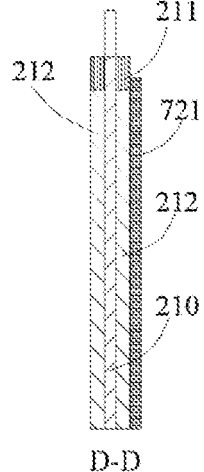
FIG. 10 is a schematic structural diagram of a section, along direction D-D, of an anode plate in FIG. 9.

In another embodiment of the present application, FIG. 10 is a schematic structural diagram of a section, along direction D-D, of a cathode plate 2 in FIG. 9. A difference between the embodiment of FIG. 9 and the embodiment shown in FIG. 7 lies in that the barrier layer 721 is provided on all of the surface of the cathode active material region 212 on the inner surface of the cathode plate 2. The specific structure, attachment manner, and position of the barrier layer 721 are the same as those in FIG. 7. In some other embodiments, the preset post-winding position may also be located on one or both surfaces of the anode plate 1 or the first separator 31 and the second separator 32, that is, the barrier layer is formed on one or both surfaces of the anode plate 1 or the first separator 31 and the second separator 32. The specific structure, attachment manner, and position of the barrier layer are the same as the attachment manner on the cathode plate 2. For details, reference may be made to the structure in FIGS. 6 to 10.

Figure 11:
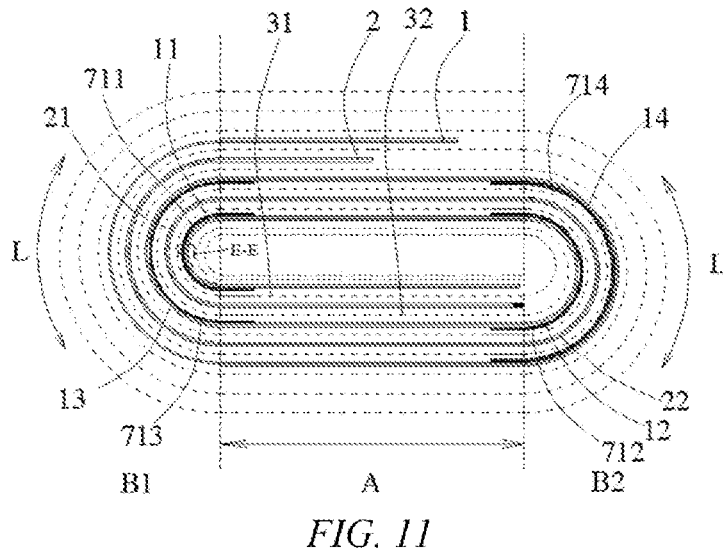
FIG. 11 is a schematic structural diagram of a cross-section of another electrode assembly flat in shape perpendicular to a winding axis according to another embodiment of the present application.

In another embodiment as shown in FIG. 11, for the related technical features of the anode plate 2, the cathode plate 1, the first separator 31, and the second separator 32 in this embodiment, reference may be made to the foregoing descriptions of the embodiments corresponding to FIGS. 6 to 10, and details are not described herein again.

A difference between the embodiment of FIG. 11 and the embodiment of FIG. 6 lies in that the preset post-winding position includes the outer surface of the first-bent part 11 of the anode plate 1, the outer surface of the second-bent part 12 of the anode plate 1, the inner surface of the third-bent part 13 of the anode plate 1, and the inner surface of the fourth-bent part 14 of the anode plate 1. That is, the first barrier layer 711 formed after the winding is provided on the outer surface of the first-bent part 11 of the anode plate 1, the second barrier layer 711 is provided on the outer surface of the second-bent part 12 of the anode plate 1, the third barrier layer 713 is provided on the inner surface of the third-bent part 11 of the anode plate 1, and the fourth barrier layer 714 is provided on the inner surface of the fourth-bent part 14 of the anode plate 1.

Figure 12:
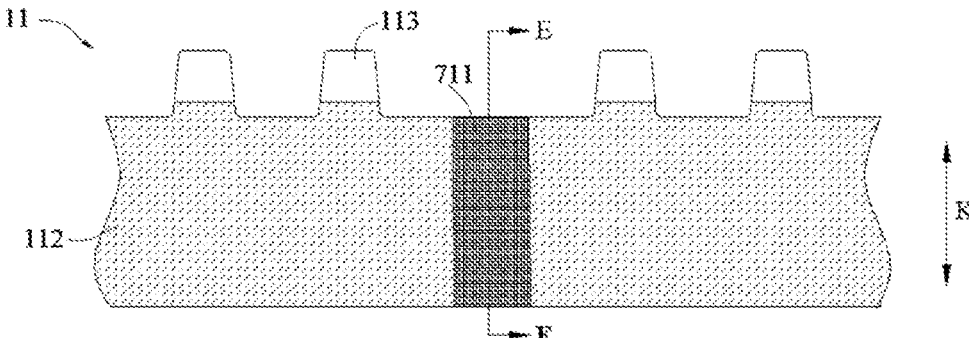
FIG. 12 is a schematic structural diagram of a cathode plate according to another embodiment of the present application.

The structure of the anode plate 1 may be as shown in FIG. 12, which is a schematic structural diagram of an anode plate 1 according to an embodiment of the present application. The anode plate 1 includes an anode body portion 11 and an anode tab portion 113 extending outwards from the anode body portion 11 along the direction K. At least part of the region on the surface of the anode body portion 11 along the direction K is an anode active material region 112, and the anode active material region 112 is configured to be coated with an anode active material that may be graphite or silicon.

In another embodiment of the present application, not only part of the region on the surface of the anode body portion 11 is provided with the anode active material region 112, but also a root region on the surface of the anode tab portion 113 close to the anode body portion 11 is also provided with the anode active material region 112, that is, part of the region of the anode tab portion 113 is the anode active material region 112.

In another embodiment of the present application, as shown in FIG. 12, the anode active material region 112 covers the entire surface of the anode body portion 11 along the direction K.

In another embodiment of the present application, the cathode active material may not cover the entire surface of the cathode plate 1.

Figure 13:
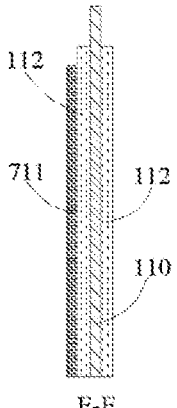
FIG. 13 is a schematic structural diagram of a section along direction E-E in FIG. 12.

FIG. 13 is a schematic structural diagram of a section along direction E-E in FIG. 12. With reference to FIG. 12, the preset post-winding position is one surface of the anode plate 1, that is, the barrier layer 711 is applied on one surface of the anode plate 1, that is, on the anode active material region 112 of one surface. At least one surface of the anode plate 1 is coated with the barrier layer, so that the passage of a large number of lithium ions can be blocked, thereby reducing the occurrence of lithium precipitation.

Figures 14, 15, 16:
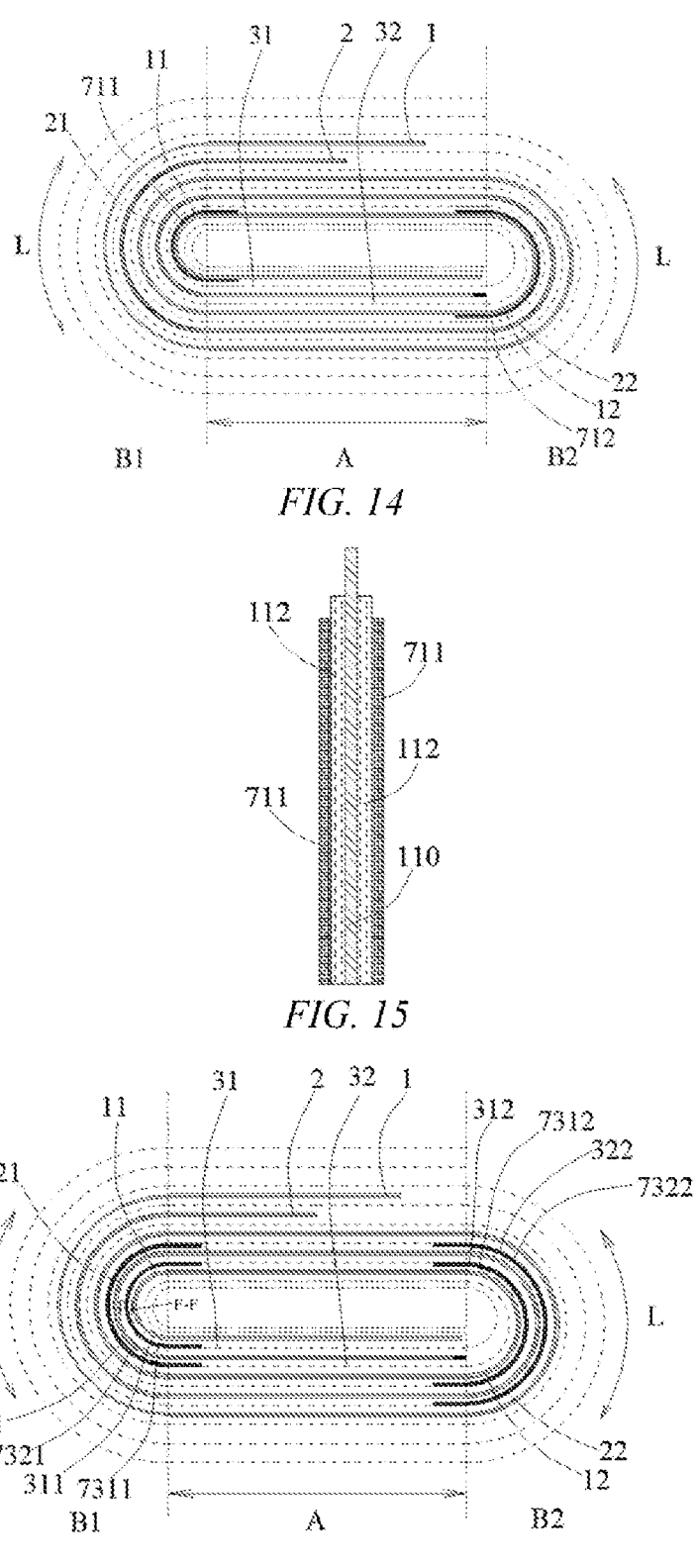
FIG. 14 is a schematic structural diagram of a cross-section of another electrode assembly flat in shape perpendicular to a winding axis according to another embodiment of the present application.
FIG. 15 is a schematic structural diagram of a section of an anode plate according to another embodiment of the present application.
FIG. 16 is a schematic structural diagram of a cross-section of an electrode assembly flat in shape perpendicular to a winding axis according to another embodiment of the present application.

In another embodiment as shown in FIG. 14, for the related technical features of the anode plate 2, the cathode plate 1, the first separator 31, and the second separator 32 in this embodiment, reference may be made to the foregoing descriptions of the embodiments corresponding to FIGS. 11 to 13, and details are not described herein again.

A difference between the embodiment of FIG. 14 and the embodiment of FIG. 11 lies in that the preset post-winding position includes the outer surface of the first-bent part 11 of the anode plate 1 and the outer surface of the second-bent part 12 of the anode plate 1. That is, the first barrier layer 711 formed after the winding is provided on the outer surface of the first-bent part 11 of the anode plate 1, and the second barrier layer 711 is provided on the outer surface of the second-bent part 12 of the anode plate 1.

FIG. 15 is a schematic structural diagram of a section of an anode plate according to another embodiment. A difference from the embodiment of FIG. 13 lies in that, the preset post-winding position is two opposite surfaces of the anode plate 1, that is, the barrier layer 711 is applied on the two opposite surfaces of the anode plate 1, that is, on the anode active material layers 112 of the two opposite surfaces. Both surfaces of the anode plate 1 are coated with the barrier layer, so that the passage of a large number of lithium ions can be blocked, thereby reducing the occurrence of lithium precipitation.

In another embodiment of the present application, both ends of the preset post-winding position extending along the bending direction L are located in the first bent region B1 and the second bent region B2 of the anode plate 1, that is, the barrier layer is all located in the first bent region B1 and the second bent region B2 of the anode plate 1. In this embodiment, the electrode assembly further includes the flat region A that joins the first bent region B1 and the second bent region B2, the bending direction L is a direction along the curved surfaces of the first bent region B1 and the second bent region B2 and toward the flat region A, and the direction perpendicular to the bending direction L is a direction perpendicular to the bending direction L.

In another embodiment of the present application, one end of the preset post-winding position extending along the bending direction L is located in the flat region A of the anode plate 1, and the other end thereof is located in the first bent region B1 and the second bent region B2 of the anode plate 1.

In another embodiment of the present application, to improve performance of the bent region in blocking lithium ions, an area of the preset post-winding position in the first bent region B1 and the second bent region B2 should be as large as possible. For example, both ends of the preset post-winding position extending along the bending direction L are located in the flat region A of the anode plate 1, that is, the barrier layer is not only located in the first bent region B1 and the second bent region B2 of the anode plate 1, but also extends further to the flat region A of the anode plate 1.

In another embodiment of the present application, both ends of the preset post-winding position extending along the bending direction L are located at boundaries between the flat region A, and the first bent region B1 and the second bent region B2 of the anode plate 1, or both ends of the preset post-winding position extending along the bending direction L are close to the boundaries between the flat region A, and the first bent region B1 and the second bent region B2 of the anode plate 1.

In another embodiment as shown in FIG. 16, for the related technical features of the anode plate 2, the cathode plate 1, the first separator 31, and the second separator 32 in this embodiment, reference may be made to the foregoing descriptions of the embodiments corresponding to FIGS. 6 to 15, and details are not described herein again.

The first separator 31 and the second separator 32 have electrical insulation and are configured to separate the cathode plate 2 and the anode plate 1 adjacent to each other to prevent the cathode plate 2 and the anode plate 1 adjacent to each other from being short-circuited. The separator 3 has a large number of through pores to ensure that electrolyte ions freely pass through, and has good permeability to lithium ions, so that the separator 3 substantially cannot block the lithium ions. For example, the separator 3 includes a separator base layer and a functional layer located on a surface of the separator base layer. The separator base layer may be at least one of polypropylene, polyethylene, an ethylene-propylene copolymer, polybutylene terephthalate, etc., and the functional layer may be a mixture layer of ceramic oxide and a binder.

A difference between the embodiment of FIG. 16 and the embodiment of FIG. 6 lies in that the preset post-winding position includes the inner surface of the first-bent part 311 of the first separator 31, the inner surface of the second-bent part 312 of the first separator 31, the inner surface of the first-bent part 321 of the second separator 32, and the inner surface of the second-bent part 322 of the second separator 32. That is, the first barrier layer 7311 formed after the winding is provided on the inner surface of the first-bent part 311 of the first separator 31, the second barrier layer 7312 is provided on the inner surface of the second-bent part 312 of the first separator 31, the third barrier layer 7321 is provided on the inner surface of the first-bent part 321 of the second separator 32, and the fourth barrier layer 7322 is provided on the inner surface of the second-bent part 322 of the second separator 32.

The barrier layers are respectively provided on the inner surfaces of the first-bent part and the second-bent part of the first separator 31 and the second separator 32, so that the passage of at least some lithium ions can be blocked, thereby reducing the occurrence of lithium precipitation.

Figure 17:
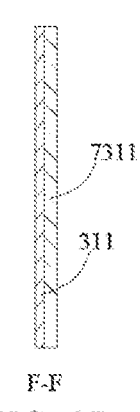
FIG. 17 is a schematic structural diagram of a section along direction F-F in FIG. 16.

FIG. 17 is a schematic structural diagram of a section, along direction F-F, of an anode plate in FIG. 16. It can be seen that the first barrier layer 7311 formed after the winding is provided on the inner surface of the first-bent part 311 of the first separator 31.

Figure 18:
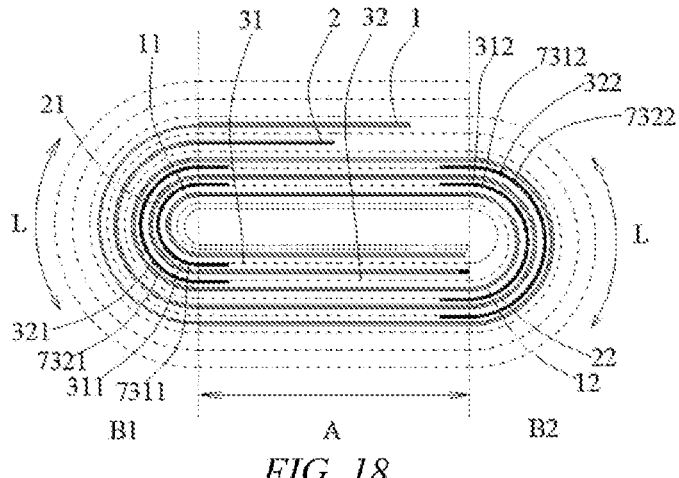
FIG. 18 is a schematic structural diagram of a cross-section of another electrode assembly flat in shape perpendicular to a winding axis according to another embodiment of the present application.

As shown in FIG. 18, in another embodiment of the present application, a difference from the embodiment of FIG. 16 lies in that the preset post-winding position includes the outer surface of the first-bent part 311 of the first separator 31, the outer surface of the second-bent part 312 of the first separator 31, the outer surface of the first-bent part 321 of the second separator 32, and the outer surface of the second-bent part 322 of the second separator 32. That is, the first barrier layer 7311 formed after the winding is provided on the outer surface of the first-bent part 311 of the first separator 31, the second barrier layer 7312 is provided on the outer surface of the second-bent part 312 of the first separator 31, the third barrier layer 7321 is provided on the outer surface of the first-bent part 321 of the second separator 32, and the fourth barrier layer 7322 is provided on the outer surface of the second-bent part 322 of the second separator 32.

Figure 19:
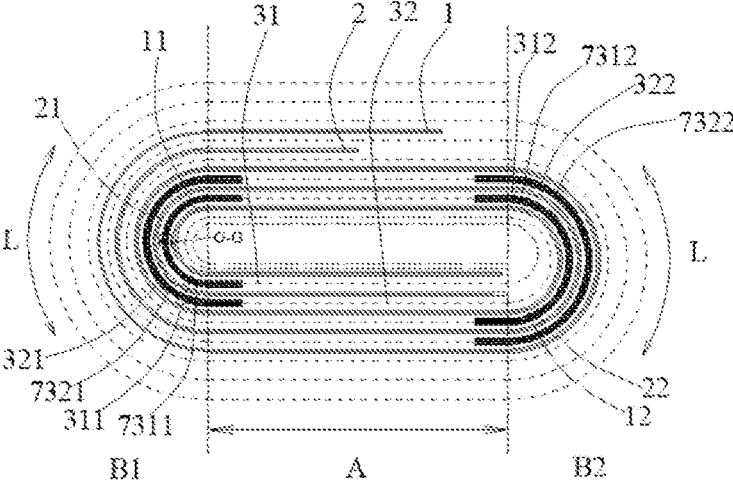
FIG. 19 is a schematic structural diagram of a cross-section of another electrode assembly flat in shape perpendicular to a winding axis according to another embodiment of the present application.

As shown in FIG. 19, in another embodiment of the present application, a difference from the embodiment of FIG. 16 lies in that the preset post-winding position includes the inner surface and the outer surface of the first-bent part 311 of the first separator 31, the inner surface and the outer surface of the second-bent part 312 of the first separator 31, the inner surface and the outer surface of the first-bent part 321 of the second separator 32, and the inner surface and the outer surface of the second-bent part 322 of the second separator 32. That is, the first barrier layer 7311 formed after the winding is provided on the inner surface and the outer surface of the first-bent part 311 of the first separator 31, the second barrier layer 7312 is provided on the inner surface and the outer surface of the second-bent part 312 of the first separator 31, the third barrier layer 7321 is provided on the inner surface and the outer surface of the first-bent part 321 of the second separator 32, and the fourth barrier layer 7322 is provided on the inner surface and the outer surface of the second-bent part 322 of the second separator 32.

Figures 20, 21, 22:
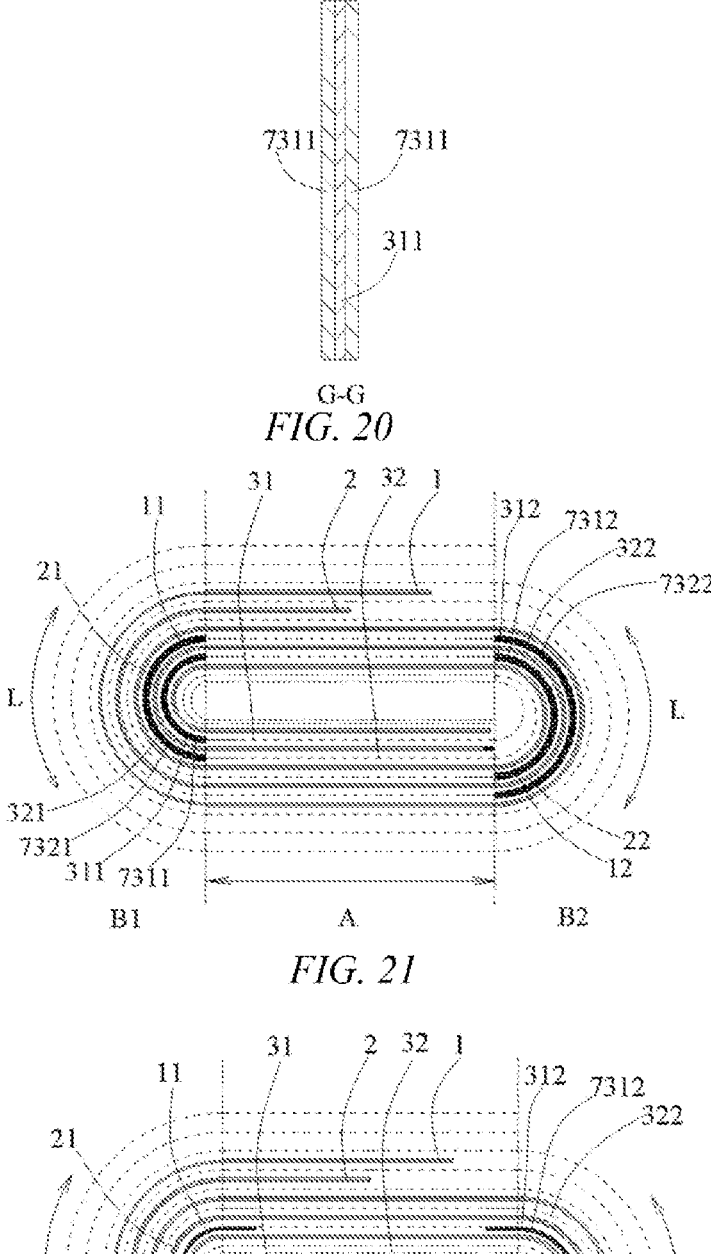
FIG. 20 is a schematic structural diagram of a section along direction G-G in FIG. 19.
FIG. 21 is a schematic structural diagram of a cross-section of another electrode assembly flat in shape perpendicular to a winding axis according to another embodiment of the present application.
FIG. 22 is a schematic structural diagram of a cross-section of another electrode assembly flat in shape perpendicular to a winding axis according to another embodiment of the present application.

FIG. 20 is a schematic structural diagram of a section, along direction G-G, of an anode plate in FIG. 19. It can be seen that the first barrier layer 7311 formed after the winding is provided on the inner surface and the outer surface of the first-bent part 311 of the first separator 31.

As shown in FIG. 21, in another embodiment of the present application, both ends of the preset post-winding position extending along the bending direction L are located in the first bent region B1 and the second bent region B2 of the first separator 31 and the second separator 32, that is, the barrier layers 7311, 7312, 7321, and 7322 are all located in the first bent region B1 and the second bent region B2 of the first separator 31 and the second separator 32. In this embodiment, the electrode assembly further includes the flat region A that joins the first bent region B1 and the second bent region B2, the bending direction L is a direction along the curved surfaces of the first bent region B1 and the second bent region B2 and toward the flat region A, and the direction perpendicular to the bending direction L is a direction perpendicular to the bending direction L.

In another embodiment of the present application, one end of the preset post-winding position extending along the bending direction L is located in the flat region A of the first separator 31 and the second separator 32, and the other end thereof is located in the first bent region B1 and the second bent region B2 of the first separator 31 and the second separator 32.

In another embodiment of the present application, to improve performance of the bent region in blocking lithium ions, an area of the preset post-winding position in the first bent region B1 and the second bent region B2 should be as large as possible. For example, both ends of the preset post-winding position extending along the bending direction L are located in the flat region A of the first separator 31 and the second separator 32, that is, the barrier layer is not only located in the first bent region B1 and the second bent region B2 of the first separator 31 and the second separator 32, but also extends further to the flat region A of the first separator 31 and the second separator 32.

In another embodiment of the present application, both ends of the preset post-winding position extending along the bending direction L are located at boundaries between the flat region A, and the first bent region B1 and the second bent region B2 of the first separator 31 and the second separator 32, or both ends of the preset post-winding position extending along the bending direction L are close to the boundaries between the flat region A, and the first bent region B1 and the second bent region B2 of the first separator 31 and the second separator 32.

As shown in FIG. 22, in another embodiment of the present application, a difference from the embodiment of FIG. 16 lies in that the preset post-winding position includes the inner surface of the first-bent part 311 of the first separator 31, and the inner surface of the second-bent part 312 of the first separator 31. That is, the first barrier layer 7311 formed after the winding is provided on the inner surface of the first-bent part 311 of the first separator 31, and the second barrier layer 7312 is provided on the inner surface of the second-bent part 312 of the first separator 31. That is, the barrier layers are provided on the inner surface of the first-bent part 311 of the first separator 31 between the first-bent part 21 of the cathode plate 2 and the first-bent part 11 of the anode plate 1, and on the inner surface of the second-bent part 312 of the first separator 31 between the second-bent part 22 of the cathode plate 2 and the second-bent part 12 of the anode plate 1, and no barrier layer is provided on the second separator 32.

In some other implementations, the preset post-winding position may also include the outer surface of the first-bent part 311 of the first separator 31 and the outer surface of the second-bent part 312 of the first separator 31.

As shown in FIG. 23, in another embodiment of the present application, a difference from the embodiment of FIG. 16 lies in that the preset post-winding position includes the inner surface and the outer surface of the first-bent part 311 of the first separator 31, and the inner surface and the outer surface of the second-bent part 312 of the first separator 31.

In some embodiments, a method for applying the adhesive on the preset part of the surface of the member to be coated includes: a press coating method, a roll coating method, or a spraying method.

As shown in FIG. 24, an embodiment according to a second aspect of the present application provides a processing apparatus 100 for an electrode assembly. The electrode assembly includes a cathode plate 2, an anode plate 1, a first separator 31, and a second separator 32. The first separator 31 and the second separator 32 are configured to separate the cathode plate from the anode plate. The electrode assembly is formed by winding the cathode plate 2, the first separator 31, the second separator 32, and the anode plate 1. The cathode plate 2 includes a cathode active material layer, and the anode plate 1 includes an anode active material layer. For a structure of the electrode assembly, reference may be made to the structure of the electrode assembly shown in the embodiments of FIGS. 6 to 23. The processing apparatus 100 of this embodiment includes a coating mechanism 5 and a winding mechanism 4. The coating mechanism 5 is configured to apply an adhesive on a preset part of a surface of a member to be coated, the adhesive forming a barrier layer, and the member to be coated including at least one of the cathode plate 2, the first separator 31, the second separator 32, and the anode plate 1. The winding mechanism 4 is configured to wind the cathode plate 2, the anode plate 1, the first separator 31, and the second separator 32 to form the electrode assembly, the coating mechanism being located upstream of the winding mechanism. The barrier layer is located between the cathode active material layer and the anode active material layer adjacent to each other after the winding, and the barrier layer is configured to: after the winding, block at least some ions de-intercalated from the cathode active material layer located on one side of the barrier layer from being intercalated into the anode active material layer located on the other side of the barrier layer.

According to the processing apparatus for the electrode assembly of this embodiment, the adhesive can be applied on the preset part of the surface of the member to be coated, the adhesive forming the barrier layer, so that the barrier layer can be efficiently and accurately applied. The preset part corresponds to a part of the anode active material layer that is prone to lithium precipitation. During charging, at least some ions de-intercalated from the cathode active material layer are blocked by the barrier layer, so that the ions blocked by the barrier layer cannot be intercalated into the anode active material layer adjacent to the cathode active material layer, thereby reducing the occurrence of lithium precipitation at the part of the anode plate that is prone to lithium precipitation, improving the safety performance of a battery cell, and prolonging the service life of the battery cell. Applying the adhesive to form the barrier layer facilitates manufacturing and processing, so that manufacturing efficiency can be improved.

As shown in FIG. 25, the processing apparatus 110 of another embodiment of the present application further includes a position information determination unit 81, a winding control unit 82, an obtaining unit 83, a coating information determination unit 84, and a coating control unit 85. The position information determination unit B1 is configured to determine position information of the preset part based on the preset post-winding position and sends the position information to the coating information confirmation unit 84, where the preset post-winding position is a position of the barrier layer in the electrode assembly after the winding, and is located between the cathode active material layer and the anode active material layer adjacent to each other, and the position information of the preset part includes information for characterizing a coating start position and a coating end position of the barrier layer. The winding control unit 82 is configured to control the winding mechanism 4 to wind the cathode plate 2, the anode plate 1, the first separator 31, and the second separator 32 that have not been coated. The obtaining unit 83 is configured to obtain winding data of the cathode plate 2, the first separator 31, the second separator 32, and the anode plate 1, and send the winding data to the coating information determination unit 84. The coating information determination unit 84 is configured to determine coating information based on the winding data and the position information of the preset part. The coating control unit 85 is configured to control, based on the coating information, the coating mechanism 5 to apply the adhesive on the surface of the member to be coated.

In this embodiment, the obtaining unit 83 may be a position sensor, a Hall sensor, or the like. The position information determination unit 81, the winding control unit 82, the coating information determination unit 84, and the coating control unit 85 may be components, such as a controller, having control and computing functions in a power consuming device. In addition, it should be noted that the position information determination unit 81, the winding control unit 82, the coating information determination unit 84, and the coating control unit 85 in this embodiment may be integrated in one chip; alternatively, the winding control unit 82 may be an independent chip, and the position information determination unit 81, the coating information determination unit 84, and the coating control unit 85 may be integrated in one chip; alternatively, the winding control unit 82 may be an independent chip, and the position information determination unit 81, the coating information determination unit 84, and the coating control unit 85 may be respectively provided on a circuit board as three circuit modules.

In some embodiments, the winding data includes a winding linear velocity V of the member to be coated, the position information of the preset part includes a coating start point length L1 and a coating end point length L2 of the barrier layer, and the coating information includes a coating start time T1 and a coating end time T2.

Correspondingly, in this embodiment, operations of the position information determination unit 81, the winding control unit 82, the obtaining unit 83, the coating information determination unit 84, and the coating control unit 85 are as follows:

The position information determination unit 81 determines the coating start point length L1 and the coating end point length L2 of the barrier layer based on the preset post-winding position, and sends them to the coating information confirmation unit. For a specific method for determining the coating start point length L1 and the coating end point length L2 of the barrier layer based on the preset post-winding position, reference may be made to the determination method in the method claims. The coating start point length L1 and the coating end point length L2 of the barrier layer may be calculated by the position information determination unit 81 based on the preset post-winding position, or the preset coating start point length L1 and coating end point length L2 of the barrier layer may be input by a user to the position information determination unit 81.

The winding control unit 82 is configured to control the winding mechanism 4 to wind the cathode plate 2, the anode plate 1, the first separator 31, and the second separator 32 that have not been coated.

The obtaining unit 83 obtains the winding linear velocity V of the member to be coated, and sends it to the coating information determination unit 84.

The coating information determination unit 84 being configured to determine the coating information based on the winding data and the position information of the preset part, in some embodiments, includes: the coating information determination unit 84 determines the coating start time T1 and the coating end time T2 based on the winding linear velocity V of the member to be coated, and the coating start point length L1 and the coating end point length L2 of the barrier layer.

The coating control unit 85 performs coating on the member to be coated based on the coating start time T1 and the coating end time T2, to form the barrier layer at the preset post-winding position. In this embodiment, for a specific method, reference may be made to the specific method corresponding to the method claims.

In some other embodiments, the winding data includes an overall winding angle $\theta$ of the cathode plate 2, the first separator 31, the second separator 32, and the anode plate 1, the position information of the preset part includes a coating start angle $\theta 1$ and a coating end angle $\theta 2$ of the barrier layer, and the coating information includes a coating start signal and a coating end signal.

Correspondingly, in this embodiment, specific operations of the position information determination unit 81, the winding control unit 82, the obtaining unit 83, the coating information determination unit 84, and the coating control unit 85 are as follows:

The position information determination unit 81 determines the coating start angle θ1 and the coating end angle θ2 of the barrier layer based on the preset post-winding position, and sends them to the coating information confirmation unit. For a specific method for determining the coating start angle θ1 and the coating end angle θ2 of the barrier layer based on the preset post-winding position, reference may be made to the determination method in the method claims. The coating start angle θ1 and the coating end angle θ2 of the barrier layer may be calculated by the position information determination unit 81 based on the preset post-winding position, or the preset coating start angle θ1 and coating end angle θ2 of the barrier layer may be input by a user to the position information determination unit 81.

The winding control unit 82 is configured to control the winding mechanism 4 to wind the cathode plate 2, the anode plate 1, the first separator 31, and the second separator 32 that have not been coated.

The obtaining unit 83 obtains the overall winding angle θ of the cathode plate 2, the first separator 31, the second separator 32, and the anode plate 1, and sends it to the coating information determination unit 84.

The coating information determination unit 84 being configured to determine the coating information based on the winding data and the position information of the preset part, in some embodiments, includes: the coating information determination unit 84 determines the coating start signal and the coating end signal based on the overall winding angle θ of the cathode plate, the separator, and the anode plate, the coating start angle θ1, and the coating end angle θ2.

The coating control unit 85 performs coating on the member to be coated based on the coating start signal and the coating end signal, to form the barrier layer at the preset post-winding position. In this embodiment, for a specific method, reference may be made to the specific method corresponding to the method claims.

In some embodiments, the preset post-winding position is one or both surfaces of the cathode plate 2, and/or one or both surfaces of the anode plate 1, and/or one or both surfaces of the first separator 31 or the second separator 32.

In all cases where the preset post-winding position is one or both surfaces of the cathode plate 2, and/or one or both surfaces of the anode plate 1, and/or one or both surfaces of the first separator 31 or the second separator 32, some ions can be blocked, and the occurrence of lithium precipitation can be reduced. The preset post-winding position may be a position of the electrode assembly that is prone to lithium precipitation after the winding. The barrier layer is formed at the preset post-winding position, so that the ions blocked by the barrier layer cannot be intercalated into the anode active material layer adjacent to the cathode active material layer, thereby reducing the occurrence of lithium precipitation at the part of the anode plate that is prone to lithium precipitation, improving the safety performance of the battery cell, and prolonging the service life of the battery cell.

In some embodiments, the cathode plate 2, the first separator 31, the second separator 32, and the anode plate 1 are wound to form a first bent region B1 and a second bent region B2. At least part of the preset post-winding position is provided in the first bent region B1 and the second bent region B2 along the surface of at least one of the cathode plate 2, the anode plate 1, or the first separator 31 and the second separator 32.

In some embodiments, at least part of the preset post-winding position is provided at a first-bent part 21 and/or a second-bent part 22 of the cathode plate 2 in the first bent region B1 and the second bent region B2, and/or at least part of the preset post-winding position is provided at a first-bent part 11 and/or a second-bent part 12 of the anode plate 1, and/or at least part of the preset post-winding position is provided at bent parts of the first separator 31 and the second separator 32 that are adjacent to the first-bent part 21 of the cathode plate 2 and/or bent parts of the first separator 31 and the second separator 32 that are adjacent to the second-bent part 22 of the cathode plate, and/or at least part of the preset post-winding position is provided at bent parts of the first separator 31 and the second separator 32 that are adjacent to the first-bent part 11 of the anode plate 1 and/or bent parts of the first separator 31 and the second separator 32 that are adjacent to the second-bent part 12 of the anode plate.

In this embodiment, the provision of the preset post-winding position may be the same as the provision in the foregoing method embodiment, and for details, reference may be made to the embodiments in FIGS. 6 to 23.

In some embodiments, the adhesive may include at least one of polyacrylic acid/acrylate, butyl benzene, phenylanine, ethylene-vinyl acetate copolymer, polypropylene, polyvinylidene fluoride, carboxymethyl cellulose, epoxy adhesive, silicone, polyurethane adhesive, styrene-isoprene-styrene copolymer adhesive, and modified materials thereof.

The processing apparatus of this embodiment is described below in detail with reference to the accompanying drawings.

Figures 26, 27:
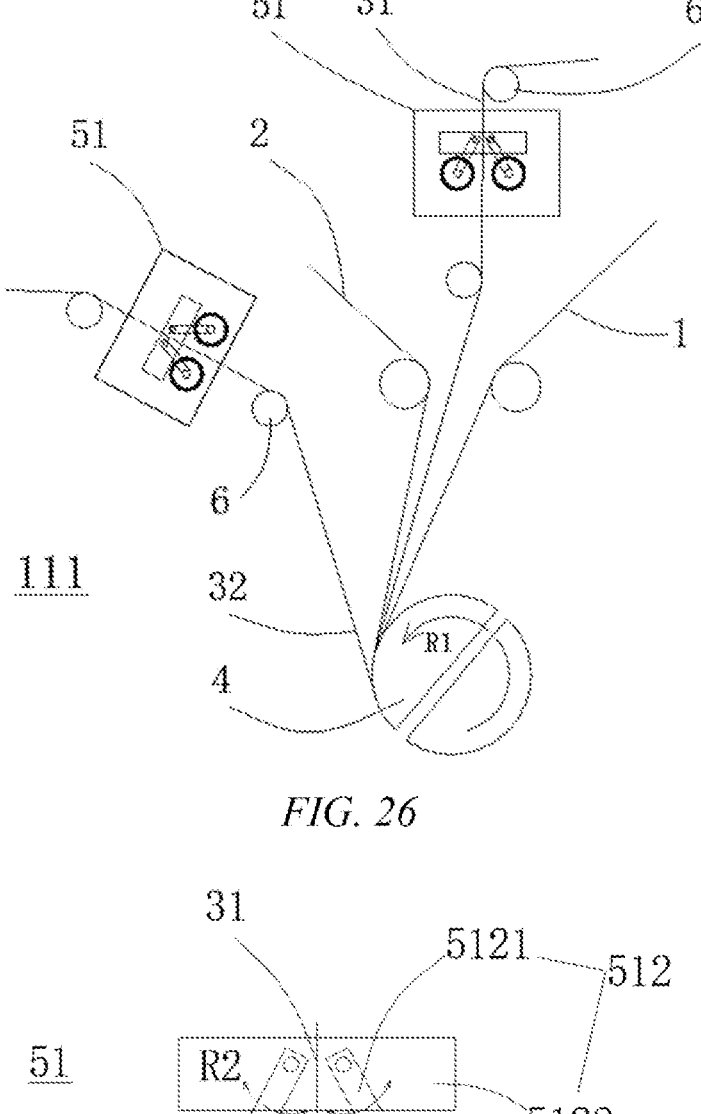
FIG. 26 is a schematic structural diagram of a processing apparatus for an electrode assembly according to another embodiment of the present application.
FIG. 27 is an enlarged schematic diagram of an embodiment of an adhesive application structure in FIG. 26.

FIG. 26 shows a processing apparatus 111 according to an embodiment, and the processing apparatus 111 includes a winding mechanism 4 and a coating mechanism 51. The winding mechanism 4 is configured to wind an anode plate 1, a first separator 31, a second separator 32, and a cathode plate 2 to form an electrode assembly. The coating mechanism 51 is located upstream of the winding mechanism, and is configured to apply an adhesive on a preset part of a surface of a member to be coated, the adhesive forming a barrier layer. In this embodiment, the members to be coated are the first separator 31 and the second separator 32, and the coating mechanisms 51 are arranged at both the first separator 31 and the second separator 32. However, this is not limiting, and the member to be coated may alternatively be the anode plate 1 and/or the cathode plate 2.

In some embodiments, the processing apparatus 111 further includes a plurality of passing rollers 6, which are respectively arranged at the anode plate 1, the first separator 31, the cathode plate 2, and the second separator 32 to tension the anode plate 1, the first separator 31, the cathode plate 2, and the second separator 32.

In some embodiments, the winding mechanism 4 is a winding needle, and a winding direction of the winding mechanism 4 is an R1 direction. The overall winding angle θ of the cathode plate, the separator, and the anode plate in the foregoing embodiment is a winding angle of the winding mechanism 4.

As shown in FIG. 27, in some embodiments, the coating mechanism 51 is configured to apply the adhesive on the preset part of the surface of the member to be coated, to form the barrier layer. The coating mechanism 51 includes: an adhesive application portion 511 configured to apply the adhesive on the preset part of the surface of the member to be coated; an adhesive supply mechanism (not shown)

configured to supply the adhesive to the adhesive application portion; and a driving mechanism 512 configured to drive the adhesive application portion to press onto or leave the surface of the member to be coated, where the driving mechanism 512 is communicatively connected to the coating control unit 85.

In some embodiments, the adhesive application portion 511 includes an adhesive roller 5111, an adsorption layer 5112 covers in a circumferential direction of the adhesive roller 5111, and the adsorption layer 5112 is in communication with the adhesive supply mechanism; and the adhesive roller 5111 is rotatably connected to the driving mechanism. When the adhesive application portion is driven by the driving mechanism 512 to press onto the surface of the member to be coated, the adsorption layer 5112 on the surface of the adhesive roller is in contact with the surface of the member to be coated and rolls along the surface of the member to be coated to apply the adhesive at the preset part of the surface of the member to be coated, the adhesive forming the barrier layer. After the adhesive has been applied on all of the preset part, the adhesive application portion 511 is driven by the driving mechanism 512 to leave the surface of the member to be coated, and the coating ends.

In some embodiments, the driving mechanism 512 includes a driving unit 5122 and a swing arm 5121, and the driving unit 5122 is connected to one end of the swing arm, to drive the swing arm 5121 to swing in an R2 direction. The driving unit may be any mechanism adapted to drive the swing arm 5121 to swing, for example, may be an electrode plus a gear set, or a motor plus an eccentric wheel, or another structure. One end of the swing arm 5121 is rotatably connected to the driving unit, and the other end thereof is rotatably connected to the adhesive roller 5111. The swing arm 5121 is driven by the driving unit 5122 to drive the adhesive application portion 511 to move.

The driving mechanism 512 includes two sets of swing arms 5121 and adhesive application portions 511. The member to be coated passes through between the two sets of swing arms 5121 and adhesive application portions 511, and the two surfaces of the member to be coated each correspond to one set of swing arm 5121 and adhesive application portion 511. The two sets of swing arms 5121 and adhesive application portions 511 may be driven together by one driving unit 5122, or may be driven respectively by two driving units 5122. Swing directions of the two sets of swing arms 5121 and adhesive application portions 511 are opposite to each other, that is, the two sets of swing arms 5121 approach or leave the member to be coated at the same time. When the adhesive is to be applied on one surface of the member to be coated, the adhesive application portion 511 corresponding to the surface to be coated with the adhesive may be in communication with the adhesive supply mechanism, while the adhesive application portion 511 corresponding to the surface on the other side does not have the adhesive, and plays a supporting role during coating, to support the adhesive application portion 511 on the side where the adhesive is adsorbed, so that the adhesive is evenly applied on the member to be coated. When the adhesive is to be applied on both surfaces of the member to be coated, the adhesive application portions 511 corresponding to the surfaces on both sides of the member to be coated may be in communication with the adhesive supply mechanism. The two adhesive application portions 511 support each other, and apply the adhesive on both surfaces of the member to be coated at the same time, so that the adhesive applied on both surfaces of the member to be coated is even and consistent. Adjusting whether the two adhesive application portions are in communication with the adhesive supply mechanism can allow the adhesive to be applied on the surface or surfaces on one or both sides of the member to be coated.

In addition, the coating mechanism 51 may be arranged on one or more of the anode plate 1, the first separator 31, the cathode plate 2, and the second separator 32 to meet the coating requirements for different members to be coated.

Figures 28, 29:
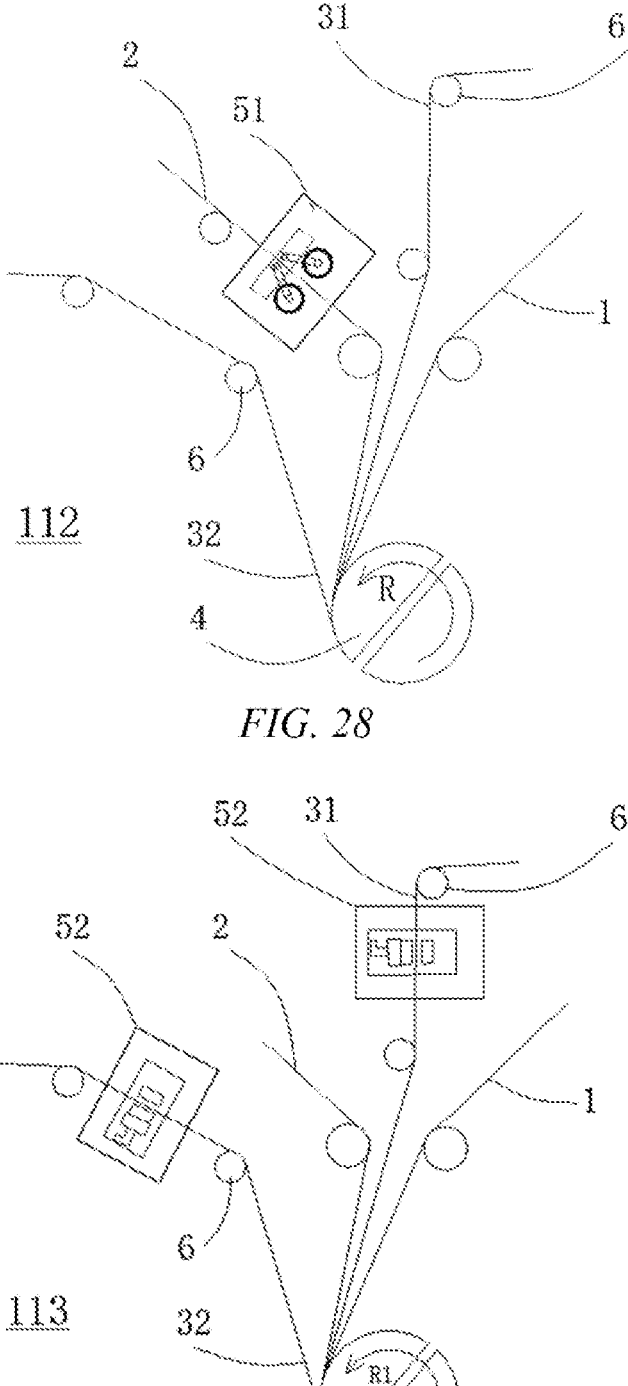
FIG. 28 is a schematic structural diagram of a processing apparatus for an electrode assembly according to another embodiment of the present application.
FIG. 29 is a schematic structural diagram of a processing apparatus for an electrode assembly according to another embodiment of the present application.

As shown in FIG. 28, a difference between this embodiment and the embodiment of FIG. 26 lies in that, the member to be coated is the cathode plate 2, and the adhesive application portion 511 is arranged on a motion trajectory of the cathode plate 2, to apply the adhesive on one or both surfaces of the cathode plate 2. In some embodiments not shown in the figures, the adhesive application portion 511 is arranged on a motion trajectory of the anode plate 1, to apply the adhesive on one or both surfaces of the anode plate 1. Further, there may also be a plurality of adhesive application portions 511, which are respectively arranged on motion trajectories of a plurality of the anode plate 1, the first separator 31, the cathode plate 2, and the second separator 32.

As shown in FIG. 29, in a processing apparatus of another embodiment of the present application, a difference from the embodiment of FIG. 26 lies in that a coating mechanism 52 has a different structure.

Figure 30:
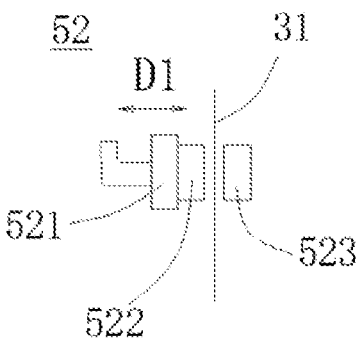
FIG. 30 is an enlarged schematic diagram of an embodiment of an adhesive application structure in FIG. 29.

FIG. 30 shows an implementation of the coating mechanism 52. The coating mechanism 52 also includes an adhesive application portion 522, an adhesive supply mechanism (not shown), and a driving mechanism 521. The adhesive application portion 522 and the driving mechanism 521 of the coating mechanism have different structures from the adhesive application portion 511 and the driving mechanism 512 in FIG. 27. An adsorption layer is provided on one side of the adhesive application portion 522 facing the member to be coated, and is in communication with the adhesive supply mechanism. The adhesive application portion 522 is driven by the driving mechanism 521 to press onto or leave the surface of the member to be coated. However, the adhesive application portion does not rotate. When the adhesive application portion 522 presses onto the surface of the application portion, the adsorption layer and the surface of the member to be coated slide relative to each other, and the adhesive is applied to the surface of the member to be coated.

In this embodiment, the driving mechanism 521 may be a pneumatic cylinder, an oil cylinder, a screw-nut mechanism, etc.

In this embodiment, the coating mechanism further includes a support 523. The support 523, and the adhesive application portion 522 and the driving mechanism 521 are respectively arranged on two sides of the member to be coated, and the support 523 is configured to support one side of the adhesive application portion 521 where the adhesive is adsorbed, so that the adhesive is evenly applied to the member to be coated. In this way, the adhesive can be applied to one surface of the member to be coated.

Figure 31:
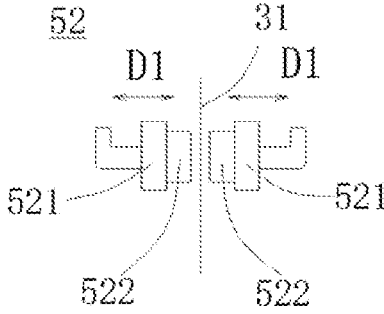
FIG. 31 is an enlarged schematic diagram of another embodiment of an adhesive application structure in FIG. 29.

As shown in FIG. 31, the coating mechanism 52 includes two sets of adhesive application portions 522 and driving mechanisms 521. The two sets of adhesive application portions 522 and driving mechanisms 521 are respectively arranged on two sides of the member to be coated. The two adhesive application portions 522 may approach or leave the member to be coated at the same time. The two adhesive application portions 521 support each other, and apply the adhesive on both surfaces of the member to be coated at the same time, so that the adhesive applied on both surfaces of the member to be coated is even and consistent. Adjusting whether the two adhesive application portions are in communication with the adhesive supply mechanism can allow the adhesive to be applied on the surface or surfaces on one or both sides of the member to be coated.

In addition, the coating mechanism 52 may be arranged on one or more of the anode plate 1, the first separator 31, the cathode plate 2, and the second separator 32 to meet the coating requirements for different members to be coated.

Figure 32:
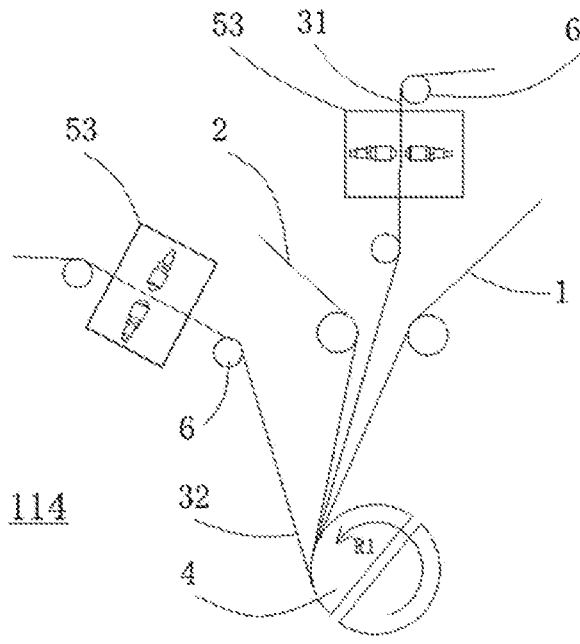
FIG. 32 is a schematic structural diagram of a processing apparatus for an electrode assembly according to another embodiment of the present application.

FIG. 32 shows another implementation of a coating mechanism 53. The coating mechanism 53 is configured to apply the adhesive on the preset part of the surface of the member to be coated, to form the barrier layer. The coating mechanism 53 includes: a spray nozzle 531 configured to apply the adhesive on the preset part of the surface of the member to be coated; an adhesive supply mechanism (not shown) configured to supply the adhesive to the spray nozzle; and a control valve (not shown) configured to connect the adhesive supply mechanism and the spray nozzle, where the control valve is communicatively connected to the coating control unit.

In some embodiments, the spray nozzle is arranged on one side of the member to be coated. In this way, the adhesive can be applied to one surface of the member to be coated.

Figure 33:
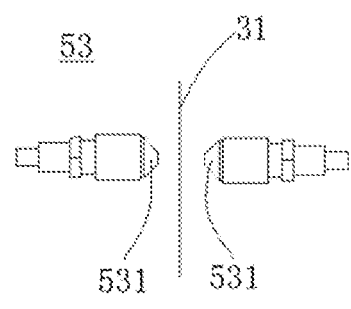
FIG. 33 is an enlarged schematic diagram of an embodiment of an adhesive application structure in FIG. 32.

In some other embodiments, as shown in FIG. 33, there are a plurality of spray nozzles, which are respectively arranged on two sides of the member to be coated. In this way, the adhesive can be applied to both surfaces of the member to be coated.

Figure 34:
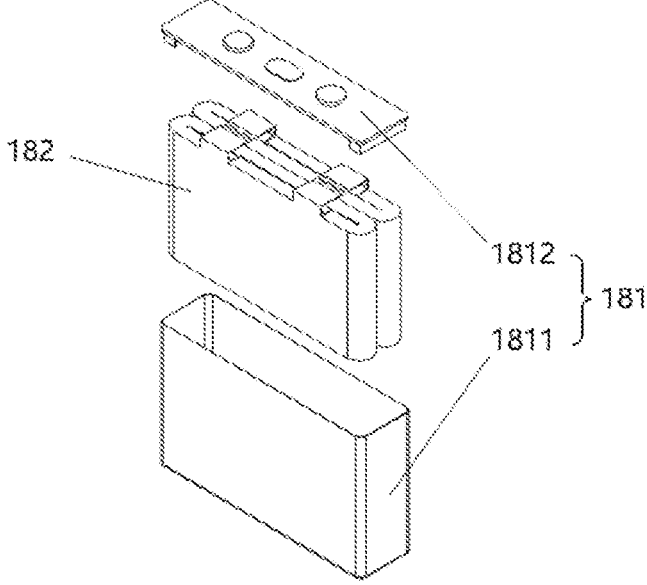
FIG. 34 is a schematic structural diagram of a battery cell according to another embodiment of the present application.

FIG. 34 is a schematic structural diagram of a battery cell according to another embodiment of the present application. The battery cell includes a housing 181 and one or more electrode assemblies 182 accommodated in the housing 181. The housing 181 includes a shell 1811 and a cover plate 1812. The shell 1811 has an accommodating cavity, and the shell 1811 has an opening, that is, there is no shell wall on this flat surface, and the interior of the shell 1811 is in communication with the outside, so that the electrode assemblies 182 can be accommodated in the accommodating cavity of the shell 1811. The cover plate 1812 is combined with the shell 1811 at the opening of the shell 1811 to form a hollow cavity. After the electrode assemblies 182 are accommodated in the housing 181, the housing 181 is filled with an electrolyte and then sealed.

The shell 1811 is shaped according to the shape of one or more electrode assemblies 182 after combination. For example, the shell 1811 may be a hollow cuboid, a hollow cube, or a hollow cylinder. For example, when the shell 1811 is a hollow cuboid or cube, one of the flat surfaces of the shell 1811 is a flat surface where an opening is located, that is, there is no shell wall on this flat surface, and the interior of the shell 1811 is in communication with the outside; and when the shell 1811 is a hollow cylinder, one of the circular side surfaces of the shell 1811 is a surface where an opening is located, that is, there is no shell wall on this circular side surface, and the interior of the shell 1811 is in communication with the outside.

In another embodiment of the present application, the shell 1811 may be made of an electrically conductive metal or plastic, and optionally, the shell 1811 is made of aluminum or aluminum alloy.

For the structure of the electrode assembly 182, reference may be made to the related content of the electrode assembly described in the forgoing embodiments of FIGS. 1 to 28, and details are not described herein again.

Figure 35:
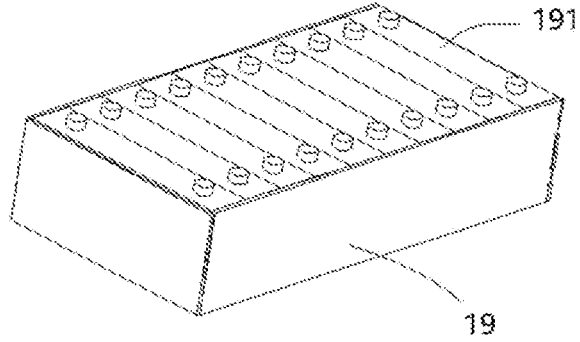
FIG. 35 is a schematic structural diagram of a battery module according to another embodiment of the present application.

FIG. 35 is a schematic structural diagram of a battery module according to another embodiment of the present application. The battery module 19 includes a plurality of battery cells 191 connected to each other, where the plurality of battery cells 191 may be in series connection, in parallel connection, or in series-parallel connection. The series-parallel connection means that both series connection and parallel connection are included. For the structure of the battery cell 191, reference may be made to the battery cell described in the embodiment corresponding to FIG. 29, and details are not described herein again.

Figure 36:
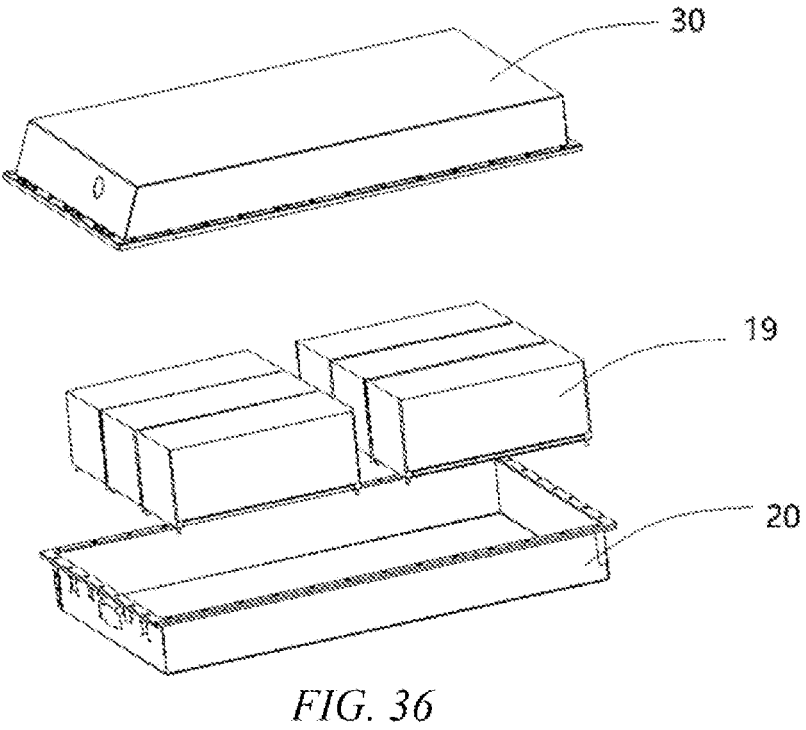
FIG. 36 is a schematic structural diagram of a battery according to another embodiment of the present application.

FIG. 36 is a schematic structural diagram of a battery according to another embodiment of the present application. The battery includes a case, with a plurality of battery cells accommodated in the case. For the structure of the battery cell, reference may be made to the structure of the battery cell shown in FIG. 29. A manner of accommodating the plurality of battery cells in the case may include: directly mounting the battery cells in the case, or assembling a plurality of battery cells into a battery module and then mounting the battery module in the battery.

As shown in FIG. 36, in some embodiments, the battery includes a plurality of battery modules 19 and a case. The case includes a lower case 20 and an upper case 30. The plurality of battery modules 19 may be in series connection or in parallel connection or in series-parallel connection. The lower case 20 has an accommodating cavity, and the lower case 20 has an opening, so that the plurality of battery modules 19 after being connected can be accommodated in the accommodating cavity of the lower case 20. The upper case 30 and the lower case 20 are combined at the opening of the lower case 20 to form a hollow cavity, and the upper case 30 and the lower case 20 are combined and then sealed.

In another embodiment of the present application, the battery may supply power to a power consuming apparatus alone. The battery may be referred to as a battery pack, for example, for supplying power to a vehicle.

In another embodiment of the present application, depending on power requirements of the power consuming apparatus, a plurality of batteries are connected to each other and then combined into a battery bank for supplying power to the power consuming apparatus. In another embodiment of the present application, the battery bank may also be accommodated in one case and packaged.

For the sake of brevity, the following embodiment is described by taking a power consuming apparatus that includes a battery as an example.

An embodiment of the present application further provides a power consuming apparatus which, for example, may be a vehicle, for example, a new-energy vehicle. The power consuming apparatus includes a battery described in the foregoing embodiment, where the battery used by the power consuming apparatus may be a battery as described in the embodiment corresponding to FIG. 31, and details are not described herein again.

Figure 37:
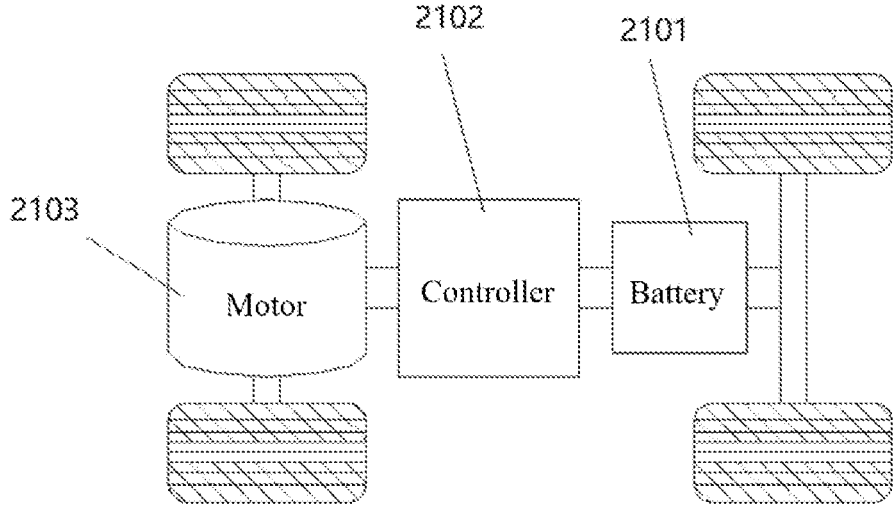
FIG. 37 is a schematic structural diagram of a power consuming apparatus according to another embodiment of the present application.

For example, FIG. 37 is a schematic structural diagram of a power consuming apparatus according to another embodiment of the present application. The power consuming apparatus may be a vehicle, which may be a fuel vehicle, a gas vehicle, or a new-energy vehicle. The new-energy vehicle may be a battery electric vehicle, a hybrid vehicle, an extended-range vehicle, etc. The vehicle includes a battery 2101, a controller 2102, and a motor 2103. The battery 2101 is configured to supply power to the controller 2102 and the motor 2103 as an operating power supply and a driving power supply of the vehicle. For example, the battery 2101 is used for meeting the working power requirements of the vehicle during starting, navigating, and running. For example, the battery 2101 supplies power to the controller 2102, the controller 2102 controls the battery 2101 to supply power to the motor 2103, and the motor 2103 receives and uses the power from the battery 2101 as the driving power of the vehicle, replacing or partially replacing the driving power provided by the fuel or natural gas for the vehicle.

Those skilled in the art should understand that, although some of the embodiments described herein include some but not other features included in other embodiments, combinations of the features of different embodiments means that they are within the scope of the present application and form different embodiments. For example, in the claims, any one of the embodiments set forth thereby can be used in any combination.

The foregoing embodiments are merely used for illustrating rather than limiting the technical solutions of the present application. Although the present application has been illustrated in detail with reference to the foregoing embodiments, it should be understood by those of ordinary skill in the art that the technical solutions recorded in the foregoing embodiments may still be modified, or some of the technical features thereof may be equivalently substituted; and these modifications or substitutions do not make the essence of the corresponding technical solution depart from the spirit and scope of the technical solutions of the embodiments of the present application.

The invention claimed is:

1. A processing method for an electrode assembly, the electrode assembly comprising a cathode plate, an anode plate, and a separator, wherein the separator is configured to separate the cathode plate from the anode plate; the electrode assembly is formed by winding the cathode plate, the separator, and the anode plate; and the cathode plate comprises a cathode active material layer, and the anode plate comprises an anode active material layer; and wherein the processing method comprises:

step 1: winding the cathode plate, the anode plate, and the separator before an adhesive is coated on one or more of the cathode plate, the anode plate, and the separator, a bent region is formed after the cathode plate, the separator, and the anode plate are wound;

step 2: determining position information of a preset part of a surface of a member to be coated with the adhesive, based on a preset post-winding position, wherein the member to be coated comprises at least one of the cathode plate, the separator, and the anode plate, the preset post-winding position corresponds to a desired position of a barrier layer formed from the adhesive in the electrode assembly after winding the cathode plate, the separator, and the anode plate to form the electrode assembly, at least part of the preset post-winding position is provided on a surface of at least one of the cathode plate, the anode plate, and the separator in the bent region, the preset post-winding position is located between the cathode active material layer and the anode active material layer adjacent to each other, and the position information of the preset part comprises information for characterizing a coating start position and a coating end position of the barrier layer;

step 3: obtaining winding data of the cathode plate, the separator, and the anode plate;

step 4: determining coating information based on the winding data and the position information of the preset part;

step 5: applying the adhesive on the preset part of the surface of the member to be coated, by a coating mechanism, based on the coating information; and step 6: winding the cathode plate, the anode plate, and the separator coated with the adhesive to form the electrode assembly, wherein the winding data comprises a winding linear velocity V of the member to be coated, wherein the position information of the preset part comprises a coating start point length L1 and a coating end point length L2 of the barrier layer, wherein the coating start position of the barrier layer corresponds to a start point of the barrier layer having the coating start point length L1, and the coating end position of the barrier layer corresponds to an end point of the barrier layer having the coating end point length L2, the coating start point length L1 being a distance between the start point of the barrier layer in a length direction of the member to be coated and a farthest initial winding end of the cathode plate, the anode plate, and the separator, and the coating end point length L2 being a distance between the end point of the barrier layer in the length direction of the member to be coated and the farthest initial winding end of the cathode plate, the anode plate, and the separator, wherein the coating information comprises a coating start time Tl and a coating end time T2, the coating start time Tl is a time from the start of a winding action to the start of coating the member to be coated, and the coating end time T2 is determined based on the coating start point length L1 and the coating end point length L2 of the barrier layer and the winding linear velocity of the member to be coated, wherein the barrier layer is located between the cathode active material layer and the anode active material layer adjacent to each other after the winding, and the barrier layer is configured to block at least some ions de-intercalated from the cathode active material layer located on one side of the barrier layer from being intercalated into the anode active material layer located on the other side of the barrier layer.

2. The processing method according to claim 1, wherein the winding data comprises an overall winding angle θ of the cathode plate, the separator, and the anode plate, the position information of the preset part comprises a coating start angle θ1 and a coating end angle θ2 of the barrier layer, and the coating information comprises a coating start signal and a coating end signal.

3. The processing method according to claim 1, wherein the preset post-winding position is one or both surfaces of the cathode plate, one or both surfaces of the anode plate, and one or both surfaces of the separator.

4. The processing method according to claim 1, wherein at least part of the preset post-winding position is provided at a first-bent part and/or a second-bent part of the cathode plate in the bent region, and/or at least part of the preset post-winding position is provided at a first-bent part and/or a second-bent part of the anode plate, and/or at least part of the preset post-winding position is provided at a bent part of the separator that is adjacent to the first-bent part of the cathode plate and/or a bent part of the separator that is adjacent to the second-bent part of the cathode plate, and/or at least part of the preset post-winding position is provided at a bent part of the separator that is adjacent to the first-bent part of the anode plate and/or a bent part of the separator that is adjacent to the second-bent part of the anode plate.

5. The processing method according to claim 1, wherein a method for the step 5 of applying the adhesive on the preset part of the surface of the member to be coated comprises: a press coating method, a roll coating method, or a spraying method.

6. The processing method according to claim 1, wherein the adhesive comprises at least one of polyacrylic acid/ acrylate, butyl benzene, phenylanine, ethylene-vinyl acetate copolymer, polypropylene, polyvinylidene fluoride, carboxymethyl cellulose, epoxy adhesive, silicone, polyurethane adhesive, styrene-isoprene-styrene copolymer adhesive, and modified materials thereof.

7. A processing apparatus for an electrode assembly, the electrode assembly comprising a cathode plate, an anode plate, and a separator, wherein the separator is configured to separate the cathode plate from the anode plate; the electrode assembly is formed by winding the cathode plate, the separator, and the anode plate; and the cathode plate comprises a cathode active material layer, and the anode plate comprises an anode active material layer; and wherein the processing apparatus comprises:

a coating mechanism configured to apply an adhesive on a preset part of a surface of a member to be coated, the adhesive forming a barrier layer, and the member to be coated comprising at least one of the cathode plate, the separator, and the anode plate;

a winding mechanism configured to wind the cathode plate, the anode plate, and the separator coated with the adhesive to form the electrode assembly, the coating mechanism is located upstream of the winding mechanism, a winding control unit configured to control the winding mechanism to wind the cathode plate, the anode plate, and the separator before the adhesive is applied by the coating mechanism;

a position information determination unit configured to determine position information of the preset part based on a preset post-winding position before applying the adhesive by the coating mechanism, wherein the preset post-winding position corresponds to a desired position of the barrier layer in the electrode assembly after winding the cathode plate, the anode plate, and the separator to form the electrode assembly, at least part of the preset post-winding position is provided on a surface of at least one of the cathode plate, the anode plate, and the separator in a bent region formed after the cathode plate, the separator, and the anode plate are wound, and the preset post-winding position is located between the cathode active material layer and the anode active material layer adjacent to each other, and the position information of the preset part comprises information for characterizing a coating start position and a coating end position of the barrier layer;

an obtaining unit configured to obtain winding data of the cathode plate, the separator, and the anode plate;

a coating information determination unit configured to receive the position information sent from the position information determination unit and determine coating information based on the winding data and the position information of the preset part; and a coating control unit configured to control, based on the coating information, the coating mechanism to apply the adhesive on the preset part of the surface of the member to be coated;

wherein the barrier layer is located between the cathode active material layer and the anode active material layer adjacent to each other after winding the cathode plate, the separator, and the anode plate coated with the adhesive, and the barrier layer is configured to: after the winding, block at least some ions de-intercalated from the cathode active material layer located on one side of the barrier layer from being intercalated into the anode active material layer located on the other side of the barrier layer, wherein the winding data comprises a winding linear velocity V of the member to be coated, wherein the position information of the preset part comprises a coating start point length L1 and a coating end point length L2 of the barrier layer, wherein the coating start position of the barrier layer corresponds to a start point of the barrier layer having the coating start point length L1, and the coating end position of the barrier layer corresponds to an end point of the barrier layer having the coating end point length L2, the coating start point length L1 being a distance between the start point of the barrier layer in a length direction of the member to be coated and a farthest initial winding end of the cathode plate, the anode plate, and the separator, and the coating end point length L2 being a distance between the end point of the barrier layer in the length direction of the member to be coated and the farthest initial winding end of the cathode plate, the anode plate, and the separator, and wherein the coating information comprises a coating start time T1 and a coating end time T2, the coating start time T1 is a time from the start of a winding action to the start of coating the member to be coated, and the coating end time T2 is determined based on the coating start point length L1 and the coating end point length L2 of the barrier layer and the winding linear velocity of the member to be coated.

8. The processing apparatus according to claim 7, wherein the winding data comprises an overall winding angle $\theta$ of the cathode plate, the separator, and the anode plate, the position information of the preset part comprises a coating start angle $\theta 1$ and a coating end angle $\theta 2$ of the barrier layer, and the coating information comprises a coating start signal and a coating end signal.

9. The processing apparatus according to claim 7, wherein the preset post-winding position is one or both surfaces of the cathode plate, one or both surfaces of the anode plate, one or both surfaces of the separator.

10. The processing apparatus according to claim 7, wherein at least part of the preset post-winding position is provided at a first-bent part and/or a second-bent part of the cathode plate in the bent region, and/or at least part of the preset post-winding position is provided at a first-bent part and/or a second-bent part of the anode plate, and/or at least part of the preset post-winding position is provided at a bent part of the separator that is adjacent to the first-bent part of the cathode plate and/or a bent part of the separator that is adjacent to the second-bent part of the cathode plate, and/or at least part of the preset post-winding position is provided at a bent part of the separator that is adjacent to the first-bent part of the anode plate and/or a bent part of the separator that is adjacent to the second-bent part of the anode plate.

11. The processing apparatus according to claim 7, wherein the coating mechanism is configured to apply the adhesive on the preset part of the surface of the member to be coated, to form the barrier layer, and the coating mechanism comprises:

an adhesive application portion configured to apply the adhesive on the preset part of the surface of the member to be coated;

an adhesive supply mechanism configured to supply the adhesive to the adhesive application portion; and a driving mechanism configured to drive the adhesive application portion to press onto or leave the surface of the member to be coated, wherein the driving mechanism is communicatively connected to the coating control unit.

12. The processing apparatus according to claim 11, wherein the adhesive application portion is arranged on one side of the member to be coated, or there are a plurality of adhesive application portions, which are respectively arranged on two sides of the member to be coated.

13. The processing apparatus according to claim 11, wherein an adsorption layer is provided on a side of the adhesive application portion facing the member to be coated, and the adsorption layer is in communication with the adhesive supply mechanism; or the adhesive application portion comprises an adhesive roller, an adsorption layer covers in a circumferential direction of the adhesive roller, and the adsorption layer is in communication with the adhesive supply mechanism; and the adhesive roller is rotatably connected to the driving mechanism.

14. The processing apparatus according to claim 7, wherein the coating mechanism is configured to apply the adhesive on the preset part of the surface of the member to be coated, to form the barrier layer, and the coating mechanism comprises:

a spray nozzle configured to apply the adhesive on the preset part of the surface of the member to be coated;

an adhesive supply mechanism configured to supply the adhesive to the spray nozzle; and a control valve configured to connect the adhesive supply mechanism and the spray nozzle, wherein the control valve is communicatively connected to the coating control unit.

15. The processing method according to claim 1, wherein the coating start time T1 is equal to a ratio of the coating start point length L1, in the coating information, of the barrier layer on the surface of the member to be coated to the winding linear velocity V, according to $T1=L1/V$, the coating end time T2 is determined based on a difference between the coating start point length L1 and the coating end point length L2, the winding linear velocity V of the member to be coated, and a coating length H of the coating mechanism, according to $T2=T1+(L2-L1-H)/V$.

16. The processing method according to claim 2, wherein the coating start angle $\theta1$ is equal to an angle by which a winding mechanism rotates when a start point of the barrier layer reaches the coating mechanism, the coating end angle $\theta2$ is equal to an angle by which the winding mechanism rotates when an end point of the barrier layer reaches the coating mechanism.

17. The processing apparatus according to claim 7, wherein the coating start time T1 is equal to a ratio of the coating start point length L1, in the coating information, of the barrier layer on the surface of the member to be coated to the winding linear velocity V, according to $T1=L1/V$, the coating end time T2 is determined based on a difference between the coating start point length L1 and the coating end point length L2, the winding linear velocity V of the member to be coated, and a coating length H of the coating mechanism, according to $T2=T1+(L2-L1-H)/V$.

18. The processing apparatus according to claim 8, wherein the coating start angle $\theta1$ is equal to an angle by which a winding mechanism rotates when a start point of the barrier layer reaches the coating mechanism, the coating end angle $\theta2$ is equal to an angle by which the winding mechanism rotates when an end point of the barrier layer reaches the coating mechanism.

* * * * *